United States Patent [19]
Faber

[11] Patent Number: 5,650,926
[45] Date of Patent: Jul. 22, 1997

[54] TRACE-AND-TRACK METHOD

[75] Inventor: Ulrich Faber, Tokyo, Japan

[73] Assignee: NEC Corporation, Tokyo, Japan

[21] Appl. No.: 397,845

[22] Filed: Mar. 2, 1995

[30] Foreign Application Priority Data

Mar. 4, 1994 [JP] Japan .................... 6-034780

[51] Int. Cl.$^6$ ........................................ G05B 13/02
[52] U.S. Cl. ...................... 364/148; 364/164; 364/165
[58] Field of Search .......................... 364/148–151, 364/152, 160, 161, 162–165, 183, 178

[56] References Cited

U.S. PATENT DOCUMENTS

| | | | |
|---|---|---|---|
| 5,119,287 | 6/1992 | Nakamura et al. | 364/148 |
| 5,379,210 | 1/1995 | Gruji et al. | 364/148 |
| 5,442,510 | 8/1995 | Schwartz et al. | 364/152 |
| 5,495,408 | 2/1996 | Caldwell | 364/153 |

OTHER PUBLICATIONS

R. Hooke et al., "Direct Search Solution of Numerical and Statistical Problems", Journal of the Association for Computing Machinery, vol. 8, Apr. 1961, pp. 212–229.

Primary Examiner—Paul P. Gordon
Assistant Examiner—Thomas E. Brown
Attorney, Agent, or Firm—Foley & Lardner

[57] ABSTRACT

After an initializing step S302, a new minimum functional value $F(*X_2)$ is obtained from a present minimum functional value $F(*X_1)$ by a exploration in a step S303. $F(*X_1)$ and $F(*X_2)$ are compared in a step S304. If $F(*X_2) \geq F(*X_1)$, then a step size is updated in a step S999, and the step S303 and the following steps are repeated. If $F(*X_2) < F(*X_1)$, then $*X_2$ is updated as $*X_1$, and $*X_1$ is updated as $*X_0$ in a step S305. $F(*X_1)$ is compared with a first functional threshold value $\epsilon_1$ in a step S306. If $F(*X_1) < \epsilon_1$, then the process is ended in a step S318. If $F(*X_1) \geq \epsilon_1$, then new $F(*X_2)$ is determined according to a pattern move in a step S307. $F(*X_1)$ and $F(*X_2)$ are compared in a step S308. If $F(*X_2) \geq F(*X_1)$, then the step S303 and the following steps are repeated. If $F(*X_2) < F(*X_1)$, then a new minimum functional value candidate $F(*X_3)$ is obtained from $F(*X_2)$ by the exploration in a step S309. $F(*X_2)$ and $F(*X_3)$ are compared in a step S310. If $F(*X_3) < F(*X_2)$, then $*X_3$ is updated as $*X_2$ in a step S311, and the step S305 and the following steps are repeated. If $F(*X_3) \geq F(*X_2)$, then the step S305 and the following steps are repeated. In this manner, the convergence rate of a trace-and-track method is raised for decreasing functional value variations.

28 Claims, 13 Drawing Sheets

TRACE-AND-TRACK METHOD

BACKGROUND OF THE INVENTION

1. Field of the Invention

The present invention relates to a trace-and-track method, and more particularly to a method for automatically controlling a feedforward type distortion compensating circuit for use in a linear amplifier operating in a high-frequency band.

2. Description of the Related Art

Heretofore, the trace-and-track method as described in "'Direct Search' Solution of Numerical and Statistical Problems" in Journal of the Association for Computing Machines, Vol. 8, pages 212 through 229, April 1961, for example, has been used as a method of controlling a distortion compensating circuit for a linear amplifier. The trace-and-track method is used to explore and follow highly accurately and automatically the optimum compensating conditions of the distortion compensating circuit for the purpose of stabilizing and keeping stable the linearity of an amplifier.

Generally, the trace-and-track method is used as a process of exploring for a point where a certain function is given at its minimum or maximum value. The trace-and-track method will be described below for use as a process of determining a minimum value of a function. The trace-and-track method is basically composed of two processing sequences. One of the procedures is an exploratory move to locate a point having a functional value less than a present functional value. The other is a pattern move in a direction where the minimum functional value determined by the exploratory move is presumed to exist.

First, the exploratory move will be described. The exploratory move is a process of giving a certain change to the vector which gives the present minimum functional value and then determining the functional value at that time. The process is repeated to determine the vector which yields a functional value smaller than the present functional value.

A flowchart of a conventional process of the exploratory move is shown in FIG. 1 of the accompanying drawings. The conventional process of the exploratory move will be described below with reference to FIG. 1. Prior to the exploratory move, the initial value of the vector which gives the present minimum functional value is given as vector $Y_1$ (hereinafter referred to as "$*Y_1$"), and the functional value at this time is denoted by $F(*Y_1)$. Before a change is given to $*Y_1$, $*Y_1$ is stored as another variable $*Y_2$ in a step S161. A coordinate component i is set to i=1 in a step S162. A suitable step size is set and added to $*Y_1$, and the sum is used as new $*Y_1$ in a step S163. The functional value $F(*Y_1)$ at $*Y_1$ thus varied is determined, and the size of $F(*Y_1)$ and $F(*Y_2)$ are compared in a step S164. If $F(*Y_1)$ is less than $F(*Y_2)$, then a new minimum value of the function has been obtained. $*Y_1$ is substituted for $*Y_2$ in a step S168, and the process is ended in a step S171. If $F(*Y_1)$ is greater than or equal to $F(*Y_2)$, then a value which is twice the step size is subtracted from $*Y_1$, i.e., the step size is subtracted from the initial value of $*Y_1$, and the remainder is used as new $*Y_1$ in a step S165. The functional value $F(*Y_1)$ at $*Y_1$ thus varied is determined, and the size of $F(*Y_1)$ and $F(*Y_2)$ are compared in a step S166. If $F(*Y_1)$ is less than $F(*Y_2)$, then $*Y_1$ is substituted for $*Y_2$ in the step S168, and the process is ended in the step S171. If $F(*Y_1)$ is greater than or equal to $F(*Y_2)$, then the step size is added to $*Y_1$, and the sum is used as new $*Y_1$ in a step S167. $*Y_1$ obtained at this time is the same as $*Y_1$ given before the exploratory move is carried out. The above procedure is carried out with respect to each coordinate component i (i=1, 2, ..., n) in steps S169, S170 for determining $*Y_2$ which gives a functional value smaller than the present minimum functional value.

The pattern move will be described. The pattern move is a predictive process for locating the minimum functional value more effectively and accurately than a simple tracing process. The pattern move, based on the vector which gives the latest minimum functional value determined by the exploratory move and the vector which has been given the minimum functional value before the exploratory move was carried out, predicts the direction in which a vector which gives a smaller functional value exists. Therefore the vector is changed toward that direction.

FIG. 2 of the accompanying drawings is a flowchart of a conventional trace-and-track method. A process of predicting a point which gives a minimum value of discretionary function will be described below with reference to FIG. 2. When an arbitrarily chosen initial base point $*X_1$ is given, a functional value $F(*X_1)$ at the base point is determined in a step S241. Using $*X_1$ as a reference, the exploratory move described above with reference to FIG. 1 is carried out. If the vector which gives the minimum functional value obtained by the exploratory move is represented by $*X_2$, then a functional value $F(*X_2)$ at this time is obtained in a step S242.

Now, $F(*X_1)$ and $F(*X_2)$ are compared in a step S243. If $F(*X_2)$ is greater than or equal to $F(*X_1)$, i.e., or if a new vector which gives a functional value less than the functional value given by the present base point vector is not obtained by the exploratory move, then the exploratory move is considered as failure. So the step size used in the exploratory move and a step size threshold value 5 are compared in a step S244. If the step size is smaller than the step size threshold value $\delta$, then since sufficient minimum value is found, and the process is ended in a step S245. If the step size is greater than or equal to the step size threshold value $\delta$, then the step size is decreased in a step S246, and the step S242 and the following steps are repeated.

If $F(*X_2)$ is smaller than $F(*X_1)$ in the step S243, then the exploratory move is considered as success. $*X_1$ is substituted for $*X_0$, and $*X_2$ is substituted for $*X_1$ in a step S247, and the pattern move is carried out in a step S248. That is, the differential vector between $*X_1$ and $*X_0$ is added to $*X_1$, and the sum is substituted for $*X_2$, determining the functional value $F(*X_2)$. Using $*X_2$ as a reference, the exploratory move described above with reference to FIG. 1 is carried out, and the minimum functional value obtained is represented by $F(*X_3)$ in a step S249.

Then, $F(*X_3)$ and $F(*X_2)$ are compared in a step S250. If $F(*X_3)$ is greater than or equal to $F(*X_2)$, then the pattern move and the exploratory move are considered as failures, and the step S242 and the following steps are repeated. If $F(*X_3)$ is smaller than $F(*X_2)$, i.e., or if a new minimum functional value is located, $X_3$ is substituted for $*X_2$ in a step S251, and the step S247 and the following steps are repeated.

The process described above with reference to FIG. 2 is repeated until the step size becomes smaller than the step size threshold value 6.

According to the conventional trace-and-track method, the exploration is finished in the step S171 when the first vector which gives the functional value less than the present minimum functional value is located in the step S164. Therefore, the conventional trace-and-track method has a problem in that no minimum functional value can be obtained if the functional value given by the vector obtained in the step S165 is smaller than the functional value given by the vector obtained in the step S163.

Furthermore, the process is finished in the step S245 when the step size becomes smaller than the step size threshold value δ in the step S244, thus there is a problem in that the process is possibly ended with no sufficient minimum functional value obtained.

The exploration is continuously carried out in the step S249 without any evaluation of the functional value given by the vector that is obtained by the pattern move in the step S248. Consequently, a problem arises in that the functional value nay possibly increase temporarily when the functional value after the pattern move in the step S248 exceeds the present minimum functional value and only the functional value greater than or equal to the present minimum functional value is obtained by the next exploration in the step S249.

In the case where the algorithm of the conventional trace-and-track method is used as the process of controlling the distortion compensating circuit, an increase and decrease in the functional value corresponds to an increase and decrease in the distortion of an output signal from the distortion compensating circuit. Therefore, in the process of minimizing the distortion according to the conventional trace-and-track method, the distortion level increases and decreases by a greater degree, causing the quality of communications to deteriorate.

SUMMARY OF THE INVENTION

It is therefore an object of the present invention to raise a convergence rate of the trace-and-track method for decreasing functional value variations.

To achieve the above object, the trace-and-track method of the present invention includes:

initializing step for setting a vector which gives a minimum value of a present function as a present minimum vector, and setting a functional value given by the present minimum vector as a present minimum functional value;

first exploring step for carrying out vector movement to change coordinate components of the present minimum vector in positive and negative directions, determining a functional value given by a vector at the coordinate components obtained by the vector movement, and setting a minimum value of the determined functional value as a new minimum functional value, thereby obtaining a new minimum vector;

first function comparing step for comparing the new minimum functional value obtained by the first exploring step with the present minimum functional value, proceeding to first vector updating step if the new minimum functional value is smaller than the present minimum functional value, and proceeding to step size updating step if the new minimum functional value is greater than or equal to the present minimum functional value;

the step size updating step for updating a step size used by the first exploring step, and returning to the first exploring step;

the first vector updating step for updating the present minimum vector as an old minimum vector, updating the new minimum vector as the present minimum vector, updating the present minimum functional value as an old minimum functional value, and updating the new minimum functional value as the present minimum functional value;

second function comparing step for comparing the present minimum functional value obtained by the first vector updating step with a first functional threshold value, proceeding to pattern moving step if the present minimum functional value is greater than or equal to the first functional threshold valuer and proceeding to ending step if the present minimum functional value is smaller than the first functional threshold value;

the ending step for ending the race-and-track method;

the pattern moving step for determining a new vector from the old minimum vector and the present minimum vector, setting the new vector as the new minimum vector, and setting a functional value given by the new minimum vector as the new minimum functional value;

third function comparing step for comparing the new minimum functional value obtained by the pattern moving step with the present minimum functional value, proceeding to second exploring step if the new minimum functional value is smaller than the present minimum functional value, and returning to the first exploring step if the new minimum functional value is greater than or equal to the present minimum functional value;

the second exploring step for carrying out vector movement to change coordinate components of the new minimum vector in positive and negative directions, determining a functional value given by a vector at the coordinate components obtained by the vector movement, and setting a minimum value of the determined functional value as a new minimum functional value candidate, thereby obtaining a new minimum vector candidate;

fourth function comparing step for comparing the new minimum functional value candidate obtained by the second exploring step with the new minimum functional value, proceeding to second vector updating step if the new minimum functional value candidate is smaller than the new minimum functional value, and returning to the first vector updating step if the new minimum functional value candidate is greater than or equal to the new minimum functional value; and the second vector updating step for updating the new minimum vector candidate as the new minimum vector, updating the new minimum functional value candidate as the new minimum functional value, and returning to the first vector updating step.

In the above-described trace-and-track method of the present invention, the first exploring step or the second exploring step includes:

base point vector storing step for storing a base point vector, which is a vector given as a exploratory base point, as a new base point vector;

coordinate component designating step for designating discretionary coordinate components of the base point vector;

vector increasing step for increasing the indicated coordinate components of the base point vector in the step size, obtaining a base point vector candidate;

fifth function comparing step for comparing a base point functional value candidate, which is given by the base point vector candidate obtained by the vector increasing step, with a new base point functional value given by the new base point vector, proceeding to first base point vector updating step if the base point functional value candidate is smaller than the new base point functional value, and proceeding to vector decreasing step if the base point functional value candidate is greater than or equal to the new base point functional value;

the first base point vector updating step for updating the base point vector candidate as the new base point vector, updating the base point functional value candidate as the new base point functional value, and proceeding to the vector decreasing step;

the vector decreasing step for decreasing the indicated coordinate components of the base point vector in the step size, obtaining the base point vector candidate;

sixth function comparing step for comparing the base point functional value candidate, which is given by the base point vector candidate obtained by the vector decreasing step, with the new base point functional value, proceeding to second base point vector updating step if the base point functional value candidate is smaller than the new base point functional value, and proceeding to third base point vector updating step if the base point functional value candidate is greater than or equal to the new base point functional value;

the second base point vector updating step for updating the base point vector candidate as the new base point vector, updating the base point functional value candidate as the new base point functional value, and proceeding to the third base point vector updating step;

the third base point vector updating step for updating the new base point vector as the base point vector and updating the new base point functional value as a base point functional value;

coordinate component judging step for judging whether designation of all coordinate components of the base point vector obtained by the third base point vector updating step has been finished or not, and ending the first exploring step or the second exploring step if the designation of all coordinate components has been finished, and proceeding to coordinate component updating step if the designation of all coordinate components has not been finished; and the coordinate component updating step for updating the indicated coordinate components, designating coordinate components which have not been indicated, and returning to the vector increasing step.

The step size updating step may include:

step size decreasing step for decreasing the step size;

step size comparing step for comparing a decreased step size obtained by the step size decreasing step with a step size threshold value, ending the step size updating step if the decreased step size is greater than or equal to the step size threshold value, and proceeding to first step size setting step if the decreased step size is smaller than the step size threshold value; and the first step size setting step for setting the step size threshold value as the decreased step size, and ending the step size updating step.

And, the step size updating step may include:

step size decreasing step for decreasing the step size;

step size comparing step for comparing a decreased step size obtained by the step size decreasing step with a step size threshold value, ending the step size updating step if the decreased step size is greater than or equal to the step size threshold value, and proceeding to first step size setting step if the decreased step size is smaller than the step size threshold value; and the first step size setting step for setting a first restart step size as the decreased step size, and ending the step size updating step.

Further, the step size updating step may include:

step size decreasing step for decreasing the step size;

step size comparing step for comparing a decreased step size obtained by the step size decreasing step with a step size threshold value, ending the step size updating step if the decreased step size is greater than or equal to the step size threshold value, and proceeding to functional value judging step if the decreased step size is smaller than the step size threshold value;

the functional value judging step for judging whether the present minimum functional value has ever even once been smaller than the first functional threshold value, proceeding to first step size setting step if the present minimum functional value has always been greater than or equal to the first functional threshold value, and proceeding to second step size setting step if the present minimum functional value has ever even once been smaller than the first functional threshold value;

the first step size setting step for setting a first restart step size as the decreased step size, and ending the step size updating step; and the second step size setting step for setting a second restart step size as the decreased step size, and ending the step size updating step.

The trace-and-track method may include monitoring step in place of the ending step, for comparing the present minimum functional value obtained by the first vector updating step with a second functional threshold value, repeating the monitoring step if the present minimum functional value is smaller than the second functional threshold value, and returning to the first exploring step if the present minimum functional value is greater than or equal to the second functional threshold value.

The trace-and-track method may include third vector updating step in place of the second vector updating step, for updating the new minimum vector as the present minimum vector, updating the new minimum vector candidate as the new minimum vector, updating the new minimum functional value as the present minimum functional value, updating the new minimum functional value candidate as the new minimum functional value, and returning to the first vector updating step.

The trace-and-track method according to the present invention offers the following advantages:

(1) In the exploring step, the vector movement is carried out to change the coordinate components of the vector in positive and negative directions, and the exploration is necessarily carried out with respect to all vectors obtained by the vector movement regardless of whether the vector which gives the functional value smaller than the present minimum functional value has been obtained or not. Therefore, it is possible to obtain the minimum functional value regardless of the sequence of the exploration, i.e., there are no exploration omissions.

Also, in the step size updating step, the process does not end even if the step size becomes smaller than the step size threshold value, but ends if the present minimum functional value becomes smaller than the first functional threshold value in the second function comparing step, i.e., or if a target minimum functional value is obtained. Therefore, the process can be continued until a sufficient minimum functional value is obtained.

Further, in the third function comparing step, the new minimum functional value obtained by the pattern moving step and the present minimum functional value are compared, and if the new minimum functional value is greater than or equal to the present minimum functional value, i.e., or if the functional value is not improved by the pattern move, the new minimum vector obtained by the pattern moving step is not stored, but the first exploring step is carried out again while holding the present minimum vector obtained by the first vector updating step. Therefore, it is possible to prevent the functional value from increasing even temporarily from the present functional value, thereby decreasing the functional value variations and raising the convergence rate.

(2) In the second function comparing step, even after the process is ended with the present minimum functional value once being smaller than the first functional threshold value, the monitoring step compares the present minimum functional value with the second functional threshold value, an resumes the process when the present minimum functional value exceeds the second functional threshold value. Therefore, the latest minimum functional value can be obtained at all times even in the case where the functional value varies to a small degree after a lapse of time or continuously due to aging.

(3) In the step size updating step, if the step size becomes smaller than the step size threshold value with no sufficient minimum functional value being obtained, then the first restart step size is set as a new step size, and the process is resumed. Thus, the exploration can be repeated until the minimum functional value is obtained.

(4) in the step size updating step, if the present minimum functional value is increased with the lapse of time or the like after having once become smaller than the first functional threshold value, then the second restart step size is set as a new step size, and the process is resumed. Thus, by setting the second restart step size to a sufficiently small value, the functional value is prevented from increasing when the process is resumed, thereby decreasing the functional value variations and raising the convergence rate.

(5) In the third vector updating step, the new minimum functional value candidate obtained by the second exploring step is not only updated as the new minimum functional value, but also the new minimum functional value obtained by the pattern moving step is updated as the present minimum functional value, and then the next pattern move is carried out. Therefore, the functional value is prevented from increasing if carrying out the pattern move, but further decreasing the functional value variations and raising the convergence rate.

As can be seen from (1) through (5) above, if the algorithm of the trace-and-track method according to the present invention is used as the process of controlling the distortion compensating circuit, any increases and decreases in the distortions of the output signal from the distortion compensating circuit can be suppressed by suppressing the functional value variations. Therefore, the range of increases and decreases of the distortion level in the process of minimizing distortions according to the trace-and-track method is decreased, making it possible to obtain the minimum functional value while maintaining high level of communication quality.

The above and other objects, features, and advantages of the present invention will become apparent from the following description based on the accompanying drawings which illustrate examples of preferred embodiments of the present invention.

DETAILED DESCRIPTION OF THE PREFERRED EMBODIMENTS

Figure 6:
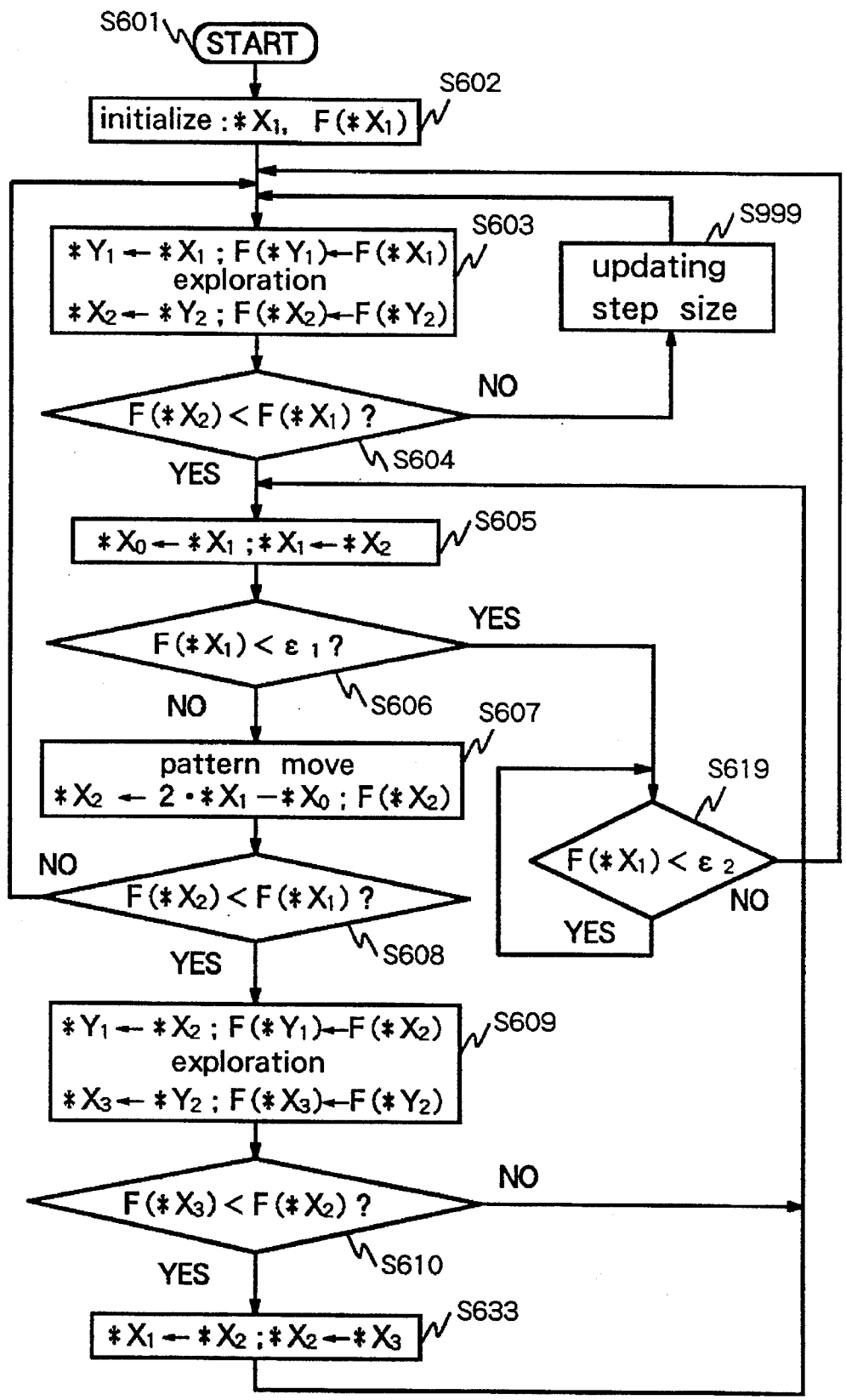
FIG. 6 is a flowchart showing eighth, tenth, and twelfth embodiments of the present invention.
Figure 7:
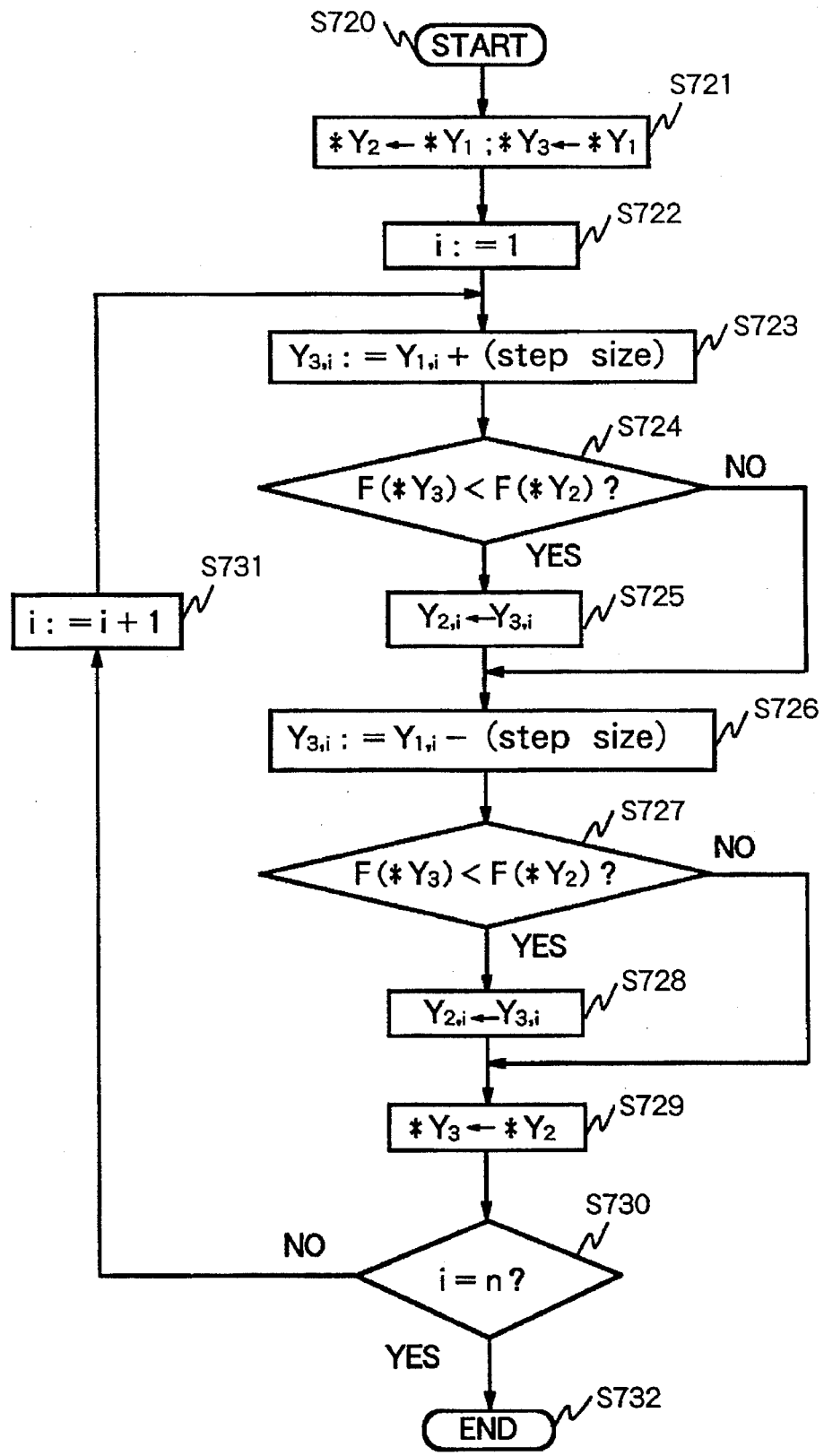
FIG. 7 is a flowchart showing a process of the exploratory move which can be used in all the embodiments of the present invention.

First through twelfth embodiments of the present invention will be described below. FIG. 7 is a flowchart showing a process of the exploratory move which can be used in all the embodiments of the present invention. The process shown in FIG. 7 corresponds to the processing sequence of steps S303, S309 shown in FIG. 3, steps S403, S409 shown in FIG. 4, steps S503, S509 shown in FIG. 5, and steps S603, S609 shown in FIG. 6, and will be described first below.

FIG. 7 is an outline of the process whereby movement is carried out in the step size in positive and negative directions with respect to coordinate axes from an initial base point vector $*Y_1$ of the exploration to determine a base point vector $*Y_2$ of the exploration which takes a minimum functional value. Details of the process shown in FIG. 7 will now be described below.

$*Y_1$ is stored as $*Y_2$, and $*Y_1$ is substituted for $*Y_3$ as an initial value for the exploratory move in a step S721. A coordinate component i is set to i=1 in a step S722. A coordinate component $Y_{1,i}$ of $*Y_1$ is increased in a previously established step size, and then substituted for $Y_{3,i}$ in a step S723. Functional value $F(*Y_3)$ of a base point candidate vector $*Y_3$ of the exploration which has the coordinate component $Y_{3,i}$ obtained in the step S723, and a functional value $F(*Y_2)$ of the base point candidate vector $*Y_2$ of the exploration are compared in a step S724. If $F(*Y_2)$ is greater than $F(*Y_3)$, then $Y_{3,i}$ obtained in the step S723 is substituted for $Y_{2,i}$ as a candidate for a new coordinate component of the exploratory base point vector and stored in a step S725. If $F(*Y_3)$ is greater than or equal to $F(*Y_2)$, then $*Y_2$ remains as it is. Next, the coordinate component $Y_{1,i}$ of $*Y_1$ is decreased in the step size, and then substituted for $Y_{3,i}$ in a step S726. The functional value $F(*Y_3)$ of $*Y_3$ which has the coordinate component $Y_{3,i}$ obtained in the step S726 and the functional value $F(*Y_2)$ of $*Y_2$ are compared in a step S727. If $F(*Y_2)$ is greater than $F(*Y_3)$, then $Y_{3,i}$ obtained in the step S726 is substituted for $Y_{2,i}$ as the candidate for the new coordinate component of the exploratory base point vector and stored in a step S728. If $F(*Y_3)$ is greater than or equal to $F(*Y_2)$, then $*Y_2$ remains as it is. Thereafter, $*Y_2$, which has been obtained as a vector having a minimum functional value in the steps S723 through S728 is updated into $*Y_3$ in a step S729. A step S730 judges whether the coordinate component i has a maximum value or not. The steps S723 through S729 are repeated with respect to all coordinate components in a step S731 until the coordinate component i takes a maximum value.

1st Embodiment

Figure 1:
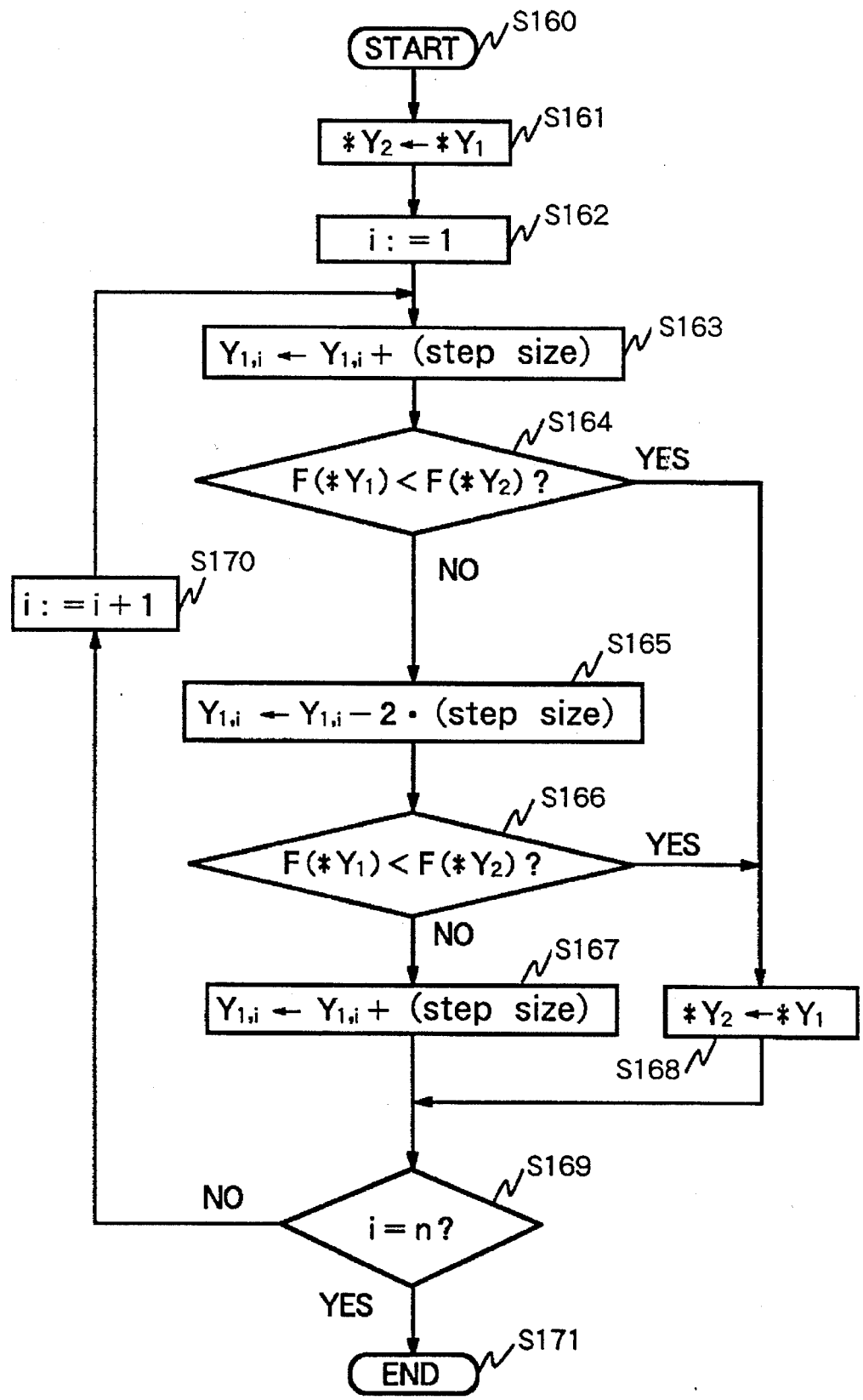
FIG. 1 is a flowchart of a conventional process of the exploratory move.
Figure 2:
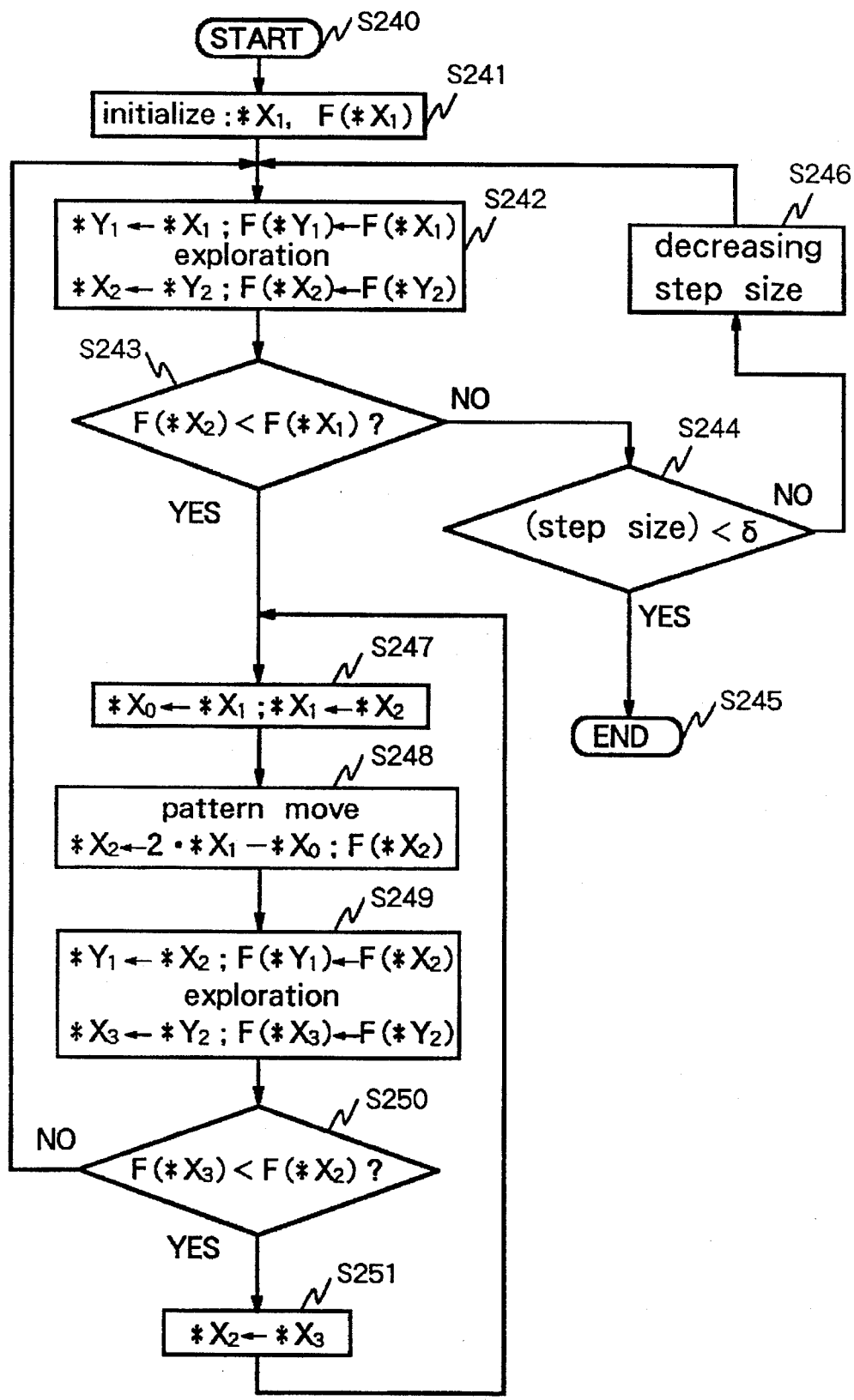
FIG. 2 is a flowchart of a conventional trace-and-track method.
Figure 3:
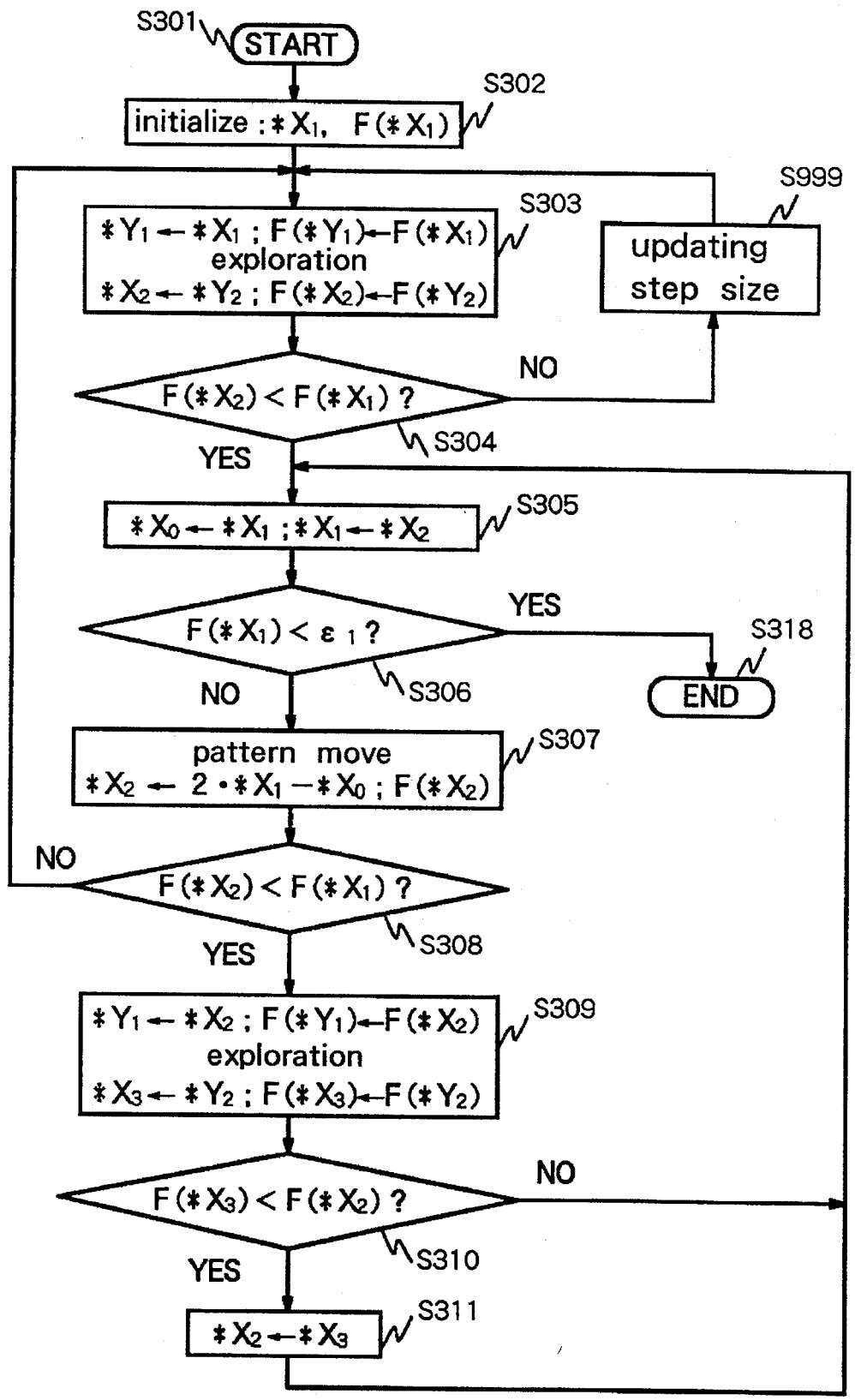
FIG. 3 is a flowchart showing first, third, and fifth embodiments of the present invention.
Figure 8:
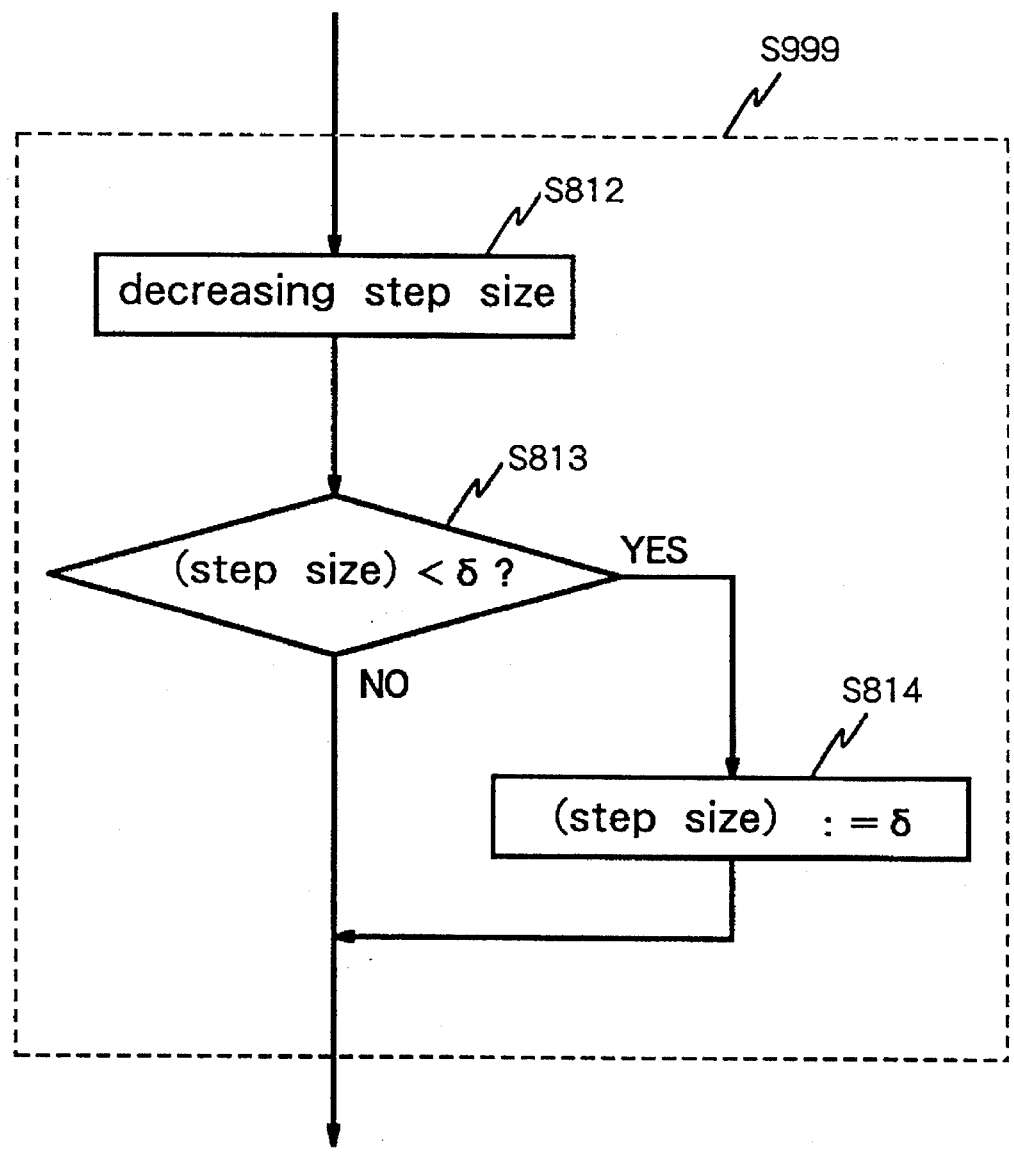
FIG. 8 is a flowchart showing a process of updating a step size in the first, second, seventh, and eighth embodiments of the present invention.

A first embodiment of the present invention will be described below with reference to the accompanying drawings. FIG. 3 is a flowchart showing the first embodiment of the present invention, and FIG. 8 is a flowchart showing a process of updating a step size in the first embodiment of the present invention.

A functional value $F(*X_1)$ of an initial base point vector $*X_1$ is calculated and initial setting is carried out in a step S302. Using $*X_1$ as an initial base point vector $*Y_1$ of the exploration, the exploration described above with reference to FIG. 7 is carried out in the step S303, and a base point vector $*Y_2$ of the exploration which is obtained in the step S303 is used as a base point vector candidate $*X_2$ of a trace-and-track method. A functional value $F(*X_2)$ of $*X_2$ and a minimum functional value $F(*X_1)$ at the present time are compared in a step S304. If $F(*X_2)$ is greater than or equal to $F(*X_1)$, then since no new base point has been obtained by the exploration, the step size is updated in a step S999, and the step S303 and the following steps are repeated.

Here, a process of updating the step size in the step S999 will be described below with reference to FIG. 8. In FIG. 8, the presently set step size is decreased in a step S812, and the decreased step size is compared with a step size threshold value $\delta$ in a step S813. If the decreased step size is smaller than the step size threshold value $\delta$, then the step size threshold value $\delta$ is set as a new step size in a step S814. If the decreased step size is greater than or equal to the step size threshold value $\delta$, then the decreased step size is used as the new step size.

If $F(*X_2)$ is smaller than $F(*X_1)$ in the step S304, then since a new base point has been obtained by the exploration, $*X_1$ is updated as an old base point vector $*X_0$, and $*X_2$ is updated as a new base point vector $*X_1$ in a step S305. A functional value $F(*X_1)$ of the new base point vector $*X_1$ and a first functional threshold value $\epsilon_1$ are compared in a step S306. If $F(*X_1)$ is smaller than the first functional threshold value $\epsilon_1$, then a minimum functional value has been obtained, and the process is ended in a step S318. If $F(*X_1)$ is greater than or equal to the first functional threshold value $\epsilon_1$, then the pattern move is carried out to determine a new base point vector candidate $*X_2$ and its functional value $F(*X_2)$ based on $*X_1$, $*X_0$ in a step S307. The functional value $F(*X_2)$ obtained in the step S307 and the functional value $F(*X_1)$ of $*X_1$ are compared in a step S308. If $F(*X_2)$ is greater than or equal to $F(*X_1)$, then the step S303 and the following steps are repeated. If $F(*X_2)$ is smaller than $F(*X_1)$, then the exploration described above with reference to FIG. 7 is carried out in the step S309, using $*X_2$ obtained in the step S307 as a base point vector. A functional value $F(*X_3)$ of a base point vector candidate $*X_3$, which is obtained in the step S309, and the functional value $F(*X_2)$ of $*X_2$ are compared in a step S310. If $F(*X_3)$ is smaller than $F(*X_2)$, then $*X_3$ is updated as $*X_2$ in a step S311. If $F(*X_3)$ is greater than or equal to $F(*X_2)$, then $*X_2$ remains as it is, and the step S305 and the following steps are repeated.

Figure 11:
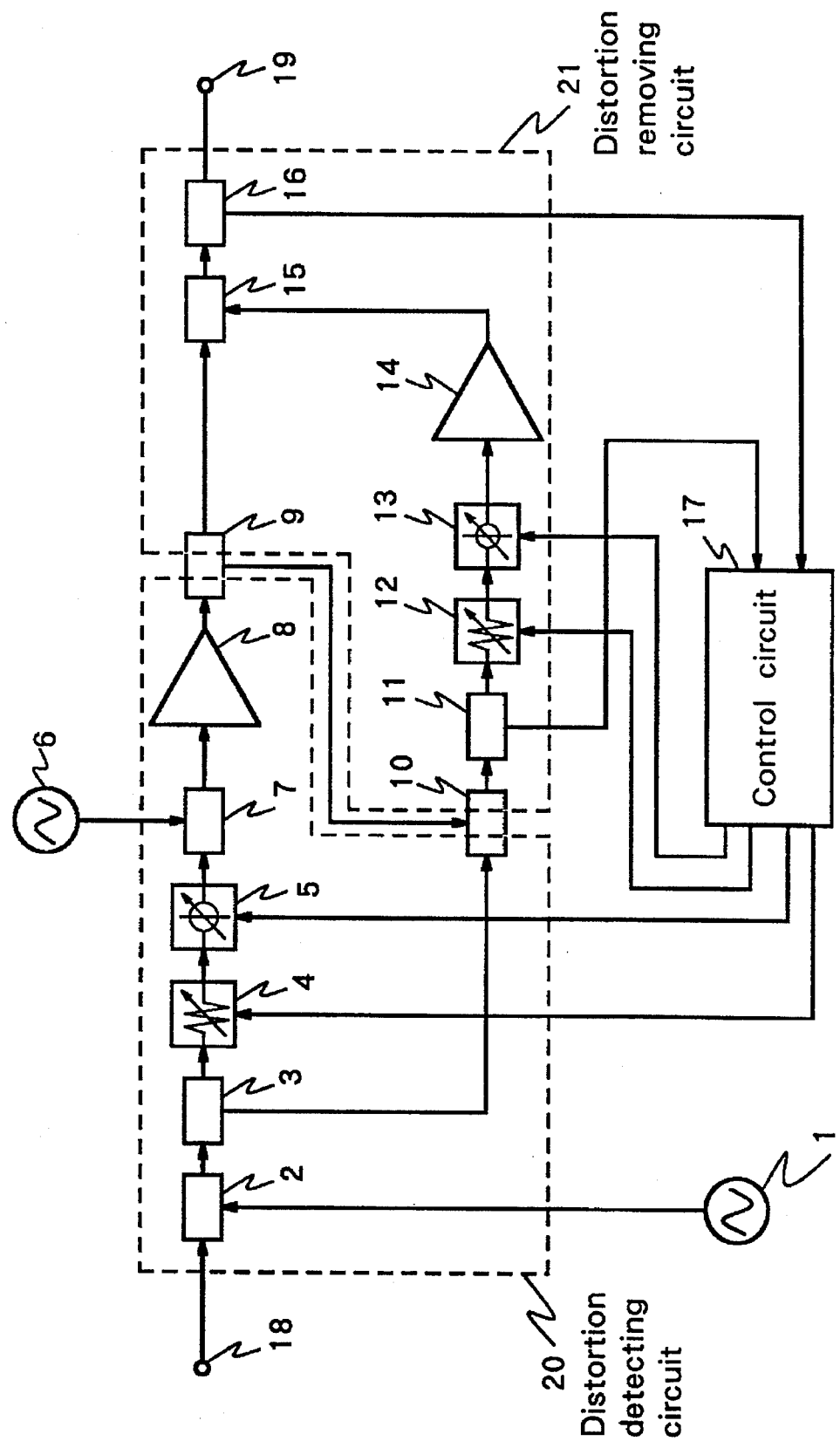
FIG. 11 is a block diagram of a general feedforward type distortion compensating circuit.

FIG. 11 shows in a block diagram a general feedforward type distortion compensating circuit. The feedforward type distortion compensating circuit shown in FIG. 11 includes oscillators 1, 6, power combiners 2, 7, 10, 15, power distributors 3, 9, 11, 16, variable attenuators 4, 12, variable phase shifters 5, 13, a main amplifier 8, an auxiliary amplifier 14, a control circuit 17, an input terminal 18, an output terminal 19, a distortion detecting circuit 20, and a distortion removing circuit 21.

A processing operation in which the first embodiment is applied as a process of controlling the circuit shown in FIG. 11 will be described below in conjunction with FIGS. 3, 7, and 8.

Here, control voltages $V_{Ln}$, $V_{Pn}$ (n=0, 1, 2, 3, ...) applied from the control circuit 17 respectively to the variable attenuator 4 and the variable phase shifter 5 correspond to $*X_n$ in FIG. 3. $U_{Ln}$, $U_{Pn}$ for storing $V_{Ln}$, $V_{Pn}$ correspond to $*Y_n$ in FIG. 7. An output signal from the oscillator 1 is supplied to the distortion detecting circuit 20, and supplied through the power combiner 2 to the power distributor 3. The level of a pilot signal (hereinafter referred to as a "pilot level") is extracted through the power combiner 10 to the power distributor 11, and supplied to the control circuit 17. The pilot level, indicated by $P_n$, extracted at this time corresponds to the functional values $F(*X_n)$, $F(*Y_n)$ shown in FIGS. 3 and 7.

The control circuit 17 applies appropriate control voltages $V_{L1}$, $V_{P1}$ respectively to the variable attenuator 4 and the variable phase shifter 5, thereby initializing them. The pilot level extracted through the power distributor 11 at this time is indicated by $P_1$ in the step S302. Then, $V_{L1}$ is stored in $U_{L2}$, $U_{L3}$, and $V_{P1}$ is stored in $U_{P2}$, $U_{P3}$ in the step S721. Leaving $V_{P1}$ as it is, $V_{L1}$ is increased in a predetermined step size, and then used as $U_{L3}$ in the step S723. The pilot level $P_3$ extracted when $U_{L3}$ is given to the variable attenuator 4 and a pilot level $P_2$ extracted when $U_{L2}$ is given to the variable attenuator 4 are compared in the step S724. If $P_3$ is smaller than $P_2$, then $U_{L3}$ at this time is stored as $U_{L2}$ in the step S725. If $P_3$ is greater than or equal to $P_2$, then $U_{L2}$ remains as it is, and the process proceeds to the step S726 without executing the step S725. In the step S726, $V_{P1}$ remains as it is, and $V_{L1}$ is decreased in the step size, and used as $U_{L3}$. The pilot levels $P_3$, $P_2$ at this time are compared in the step S727. If $P_3$ is smaller than $P_2$, then $U_{L3}$ at this time is stored as $U_{L2}$ in the step S728. If $P_3$ is greater than or equal to $P_2$, then $U_{L2}$ remains as it is, and the process proceeds to the step S729 without executing the step S728. In the step S729, $U_{L2}$ is updated as $U_{L3}$. The above processing sequence is repeated while keeping the control voltage of the variable attenuator 4 constant and varying the control voltage of the variable phase shifter 5.

In this manner, a minimum value of the pilot level is obtained as $P_2$, and a voltage applied to the variable attenuator 4 at this time is obtained as $V_{L2}$, and a voltage applied to the variable phase shifter 5 at this time is obtained as $V_{P2}$ in the step S303.

Thereafter, $P_1$, $P_2$ are compared in the step S304. If $P_2$ is greater than or equal to $P_1$, then the step size is decreased in the step S812, and the decreased step size is compared with the step size threshold value in the step S813. If the decreased step size is smaller than the step size threshold value, then the step size threshold value δ is set as a new step size in the step S814. If the decreased step size is greater than or equal to the step size threshold value δ, then the decreased step size is used as the new step size, and the step S303 and the following steps are repeated.

In the step S304, if $P_2$ is smaller than $P_1$, i.e., or if the pilot level got lowered due to the exploration, then the exploration is considered as success. $V_{L1}$, $V_{P1}$, $P_1$ are updated respectively as $V_{L0}$, $V_{P0}$, $P_0$, $P_2$ is updated as a latest minimum pilot level $P_1$, and $V_{L2}$, $V_{P2}$ are updated respectively as $V_{L1}$, $V_{P1}$ in the step S305.

The latest minimum pilot level $P_1$ obtained in the step S305 and a first pilot level threshold value $\epsilon_1$ are compared in the step S306. If $P_1$ is smaller than $\epsilon_1$, then the processing sequence is ended in the step S318. If $P_1$ is greater than or equal to $\epsilon_1$, then control voltages of the variable attenuator 4 and the variable phase shifter 5 for giving a minimum value of a new pilot level are estimated from $V_{L0}$, $V_{P0}$ and $V_{L1}$, $V_{P1}$, and the estimated control voltages are outputted. Specifically, $V_{L2}$, $V_{P2}$ according to the following formulas (1), (2), respectively:

$$V_{L2} = 2V_{L1} - V_{L0} \quad (1)$$

$$V_{P2} = 2V_{P1} - V_{P0} \quad (2)$$

are calculated, and supplied respectively to the variable attenuator 4 and the variable phase shifter 5, and the pilot level $P_2$ at this time is read in the step S307. The latest minimum pilot level $P_1$ and the pilot level $P_2$ obtained in the step S307 are compared in the step S308. If $P_2$ is greater than or equal to $P_1$, then it is considered that the estimate was wrong, and the process returns to the step S303 to carry out the exploration around $V_{L1}$, $V_{P1}$. If $P_2$ is smaller than $P_1$, i.e., or if by estimation a control voltage $V_{L2}$ of the variable attenuator 4 and a control voltage $V_{P2}$ of the variable phase shifter 5 are such that the pilot level is further decreased then, the exploration is as in the step S303 carried out around $V_{L2}$ and $V_{P2}$, the smallest of the pilot levels is represented by $P_3$, and control voltages applied to the variable attenuator 4 and the variable phase shifter 5 at this time are given by $V_{L3}$, $V_{P3}$ in the step S309. The minimum pilot level $P_2$ determined at the this point and the pilot level $P_3$ obtained in the step S309 are compared in the step S310. If $P_3$ is greater than or equal to $P_2$, then it is considered that the exploration has failed, and the step S305 and the following steps are repeated. If $P_2$ is greater than $P_3$, then it is considered that the exploration has succeeded, the pilot level $P_3$ obtained in the step S309 is updated as a minimum pilot level $P_2$, the control voltages $V_{L3}$, $V_{P3}$ applied to the variable attenuator 4 and the variable phase shifter 5 at this time are updated respectively as $V_{L2}$, $V_{P2}$ in the step S311. Thereafter, the Step S305 and the following steps are repeated.

The above processing sequence has been described as a process of controlling the distortion detecting circuit 20. However, a process of controlling the distortion removing circuit 21 can also be carried out in the same manner as described above insofar as the oscillator 1 is replaced with the oscillator 6, the power combiner 2 with the power combiner 7, the variable attenuator 4 with the variable attenuator 12, the variable phase shifter 5 with the variable phase shifter 13, the power combiner 10 with the power combiner 15, and the power distributor 11 with the power distributor 16 in the above description. The control voltages in the variable attenuator 4 and the variable phase shifter 5 may be varied in a random order in the step S303. While the variable attenuator 4 and the variable phase shifter 5 are shown as being voltage-controlled, they may be current-controlled as well.

2nd Embodiment

Figure 4:
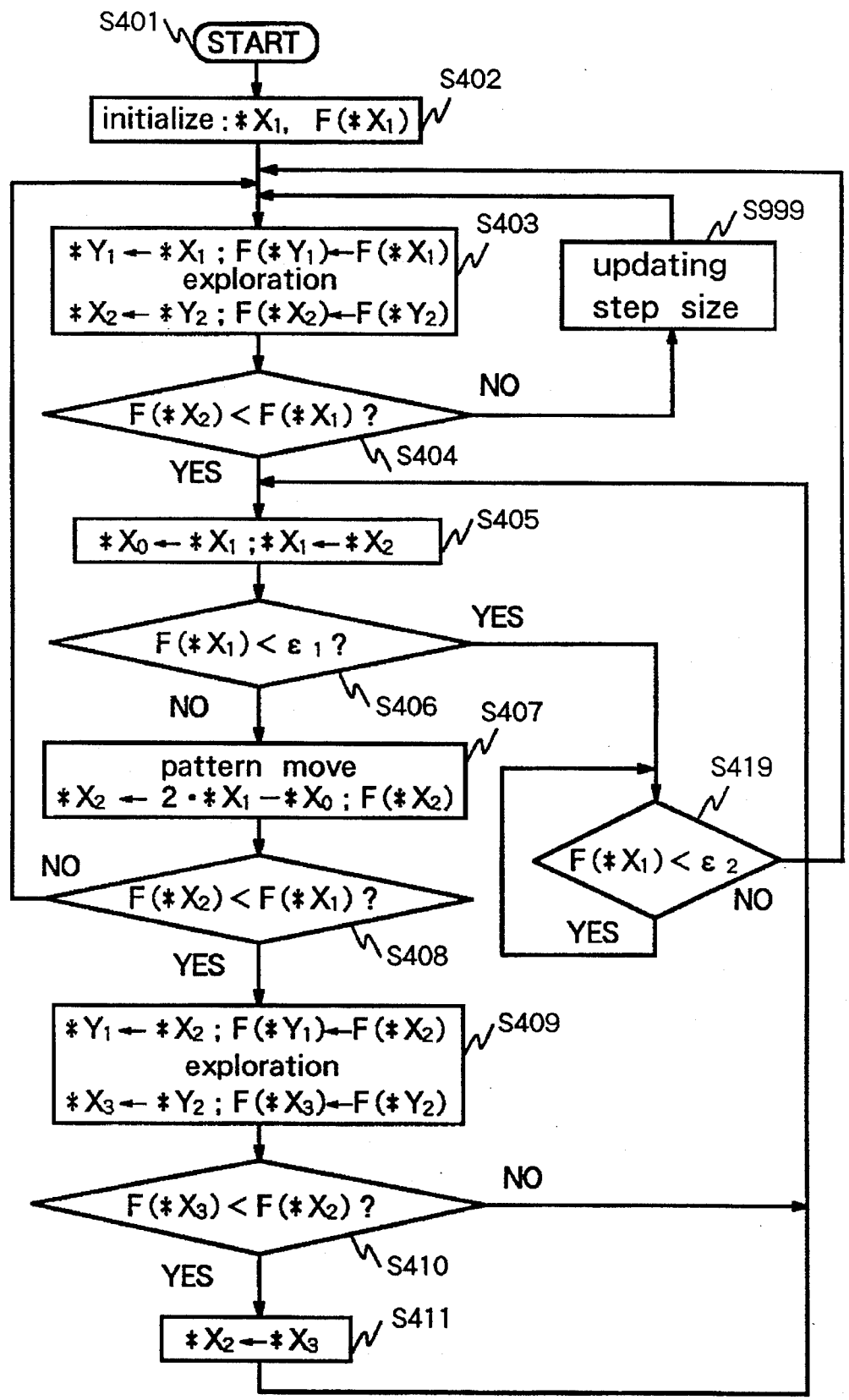
FIG. 4 is a flowchart showing second, fourth, and sixth embodiments of the present invention.

A second embodiment of the present invention will be described below with reference to the accompanying drawings. FIG. 4 is a flowchart showing the second embodiment of the present invention, and FIG. 8 is a flowchart showing a process of updating a step size in the second embodiment of the present invention.

The processing sequence of the second embodiment is substantially the same as that of the first embodiment. Identical processes in FIGS. 3 and 4 are indicated by identical final digits. The processing sequence shown in FIG. 4 is different from that shown in FIG. 3 in that if the functional value $F(*X_1)$ of the new base point vector $*X_1$ is smaller than the first functional threshold value $\epsilon_1$ in a step S406, then instead of ending the process (as in the step S318 shown in FIG. 3), $F(*X_1)$ is compared with a second functional threshold value $\epsilon_2$ in a step S419. If $F(*X_1)$ is smaller than $\epsilon_2$, then the step S419 is repeated. If $F(*X_1)$ is greater than or equal to $\epsilon_2$, then the step S403 and the following steps are repeated.

With regard to the process of the second embodiment used as the method of control for the circuit shown in FIG. 11, only those steps of the process which differ from the first embodiment will be described below with reference to FIG. 4. If the latest minimum pilot level $P_1$ obtained in the step S403 is smaller than the first pilot level threshold value $\epsilon_1$ in the step S406, then the process is not ended, and $P_1$ is compared with a second pilot level threshold value $\epsilon_2$ in the step S419. If $P_1$ is smaller than $\epsilon_2$, then the step S419 is repeated. If $P_1$ is greater than or equal to $\epsilon_2$, then the step S403 and the following steps are repeated. That is, the process is stopped as long as $P_1$ is smaller than $\epsilon_2$, and is resumed when $P_1$ becomes greater than or equal to $\epsilon_2$. The other processing steps and conditions will not be described as they are the same as those of the first embodiment.

3rd Embodiment

Figure 9:
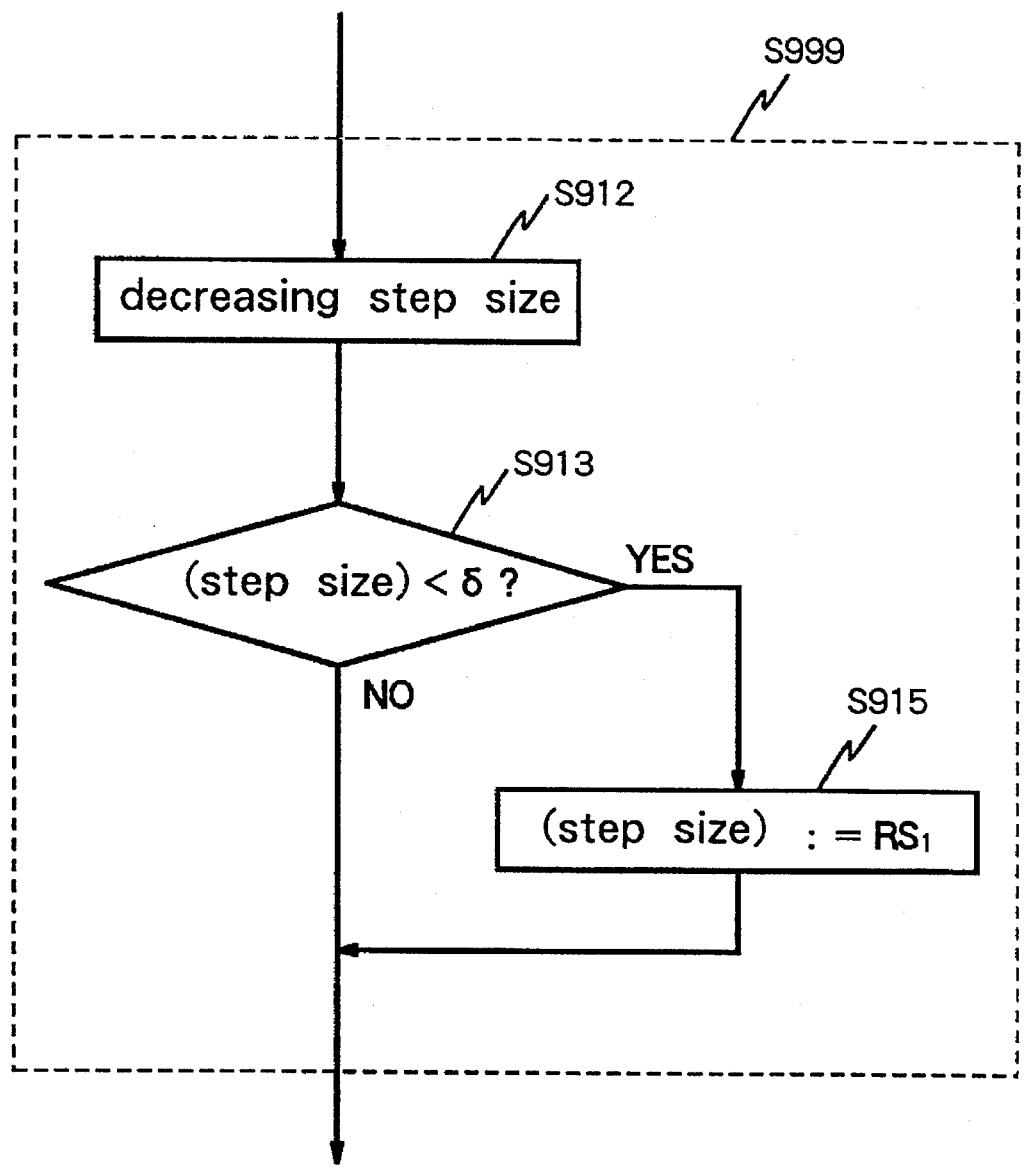
FIG. 9 is a flowchart showing a process of updating a step size in the third, fourth, ninth, and tenth embodiments of the present invention.

A third embodiment of the present invention will be described below with reference to the accompanying drawings. FIG. 3 is a flowchart showing the third embodiment of the present invention, and FIG. 9 is a flowchart showing a process of updating a step size in the third embodiment of the present invention.

The processing sequence of the third embodiment is substantially the same as that of the first embodiment. Identical processes in FIGS. 8 and 9 are indicated by identical final digits. The processing sequence shown in FIG. 9 is different from that shown in FIG. 8 in that if the decreased step size is smaller than the step size threshold value 6 in a step S913, then instead of setting δ as a new step size (as in the step S814 shown in FIG. 8), a first restart step size $RS_1$ is set as the new step size in a step S915.

With regard to the process of the third embodiment used as the method of control for the circuit shown in FIG. 11, only those steps of the process which differ from the first embodiment will be described below with reference to FIGS. 3 and 9. If the pilot level $P_2$ obtained in the step S303 is greater than or equal to the pilot level $P_1$ prior to the exploration in the step S304, then the step size is decreased in a step S912, and the decreased step size is compared with δ in the step S913. If the decreased step size is greater than or equal to δ, then the decreased step size is set as a new step size, and the step S303 and the following steps are repeated. If the decreased step size is smaller than δ, then $RS_1$ is set as the new step size in the step S915, and the step S303 and the following steps are repeated. The other processing steps and conditions will not be described as they are the same as those of the first embodiment.

4th Embodiment

A fourth embodiment of the present invention will be described below with reference to the accompanying drawings. FIG. 4 is a flowchart showing the fourth embodiment of the present invention, and FIG. 9 is a flowchart showing a process of updating a step size in the fourth embodiment of the present invention.

The processing sequence of the fourth embodiment is substantially the same as that of the second embodiment. Identical processes in FIGS. 8 and 9 are indicated by identical final digits. The processing sequence shown in FIG. 9 is different from that shown in FIG. 8 in that if the decreased step size is smaller than δ in the step S913, then instead of setting as a new step size (as in the step S814 shown in FIG. 8), the first restart step size $RS_1$ is set as the new step size in the step S915.

With regard to the process of the fourth embodiment used as the method of control for the circuit shown in FIG. 11, only those steps of the process which differ from the second embodiment will be described below with reference to FIGS. 4 and 9. If the pilot level $P_2$ obtained in the step S403 is greater than or equal to the pilot level $P_1$ prior to the exploration in a step S404, then the step size is decreased in the step S912, and the decreased step size is compared with δ in the step S913. If the decreased step size is greater than or equal to δ, then the decreased step size is set as a new step size, and the step S403 and the following steps are repeated. If the decreased step size is smaller than δ, then $RS_1$ is set as the new step size in the step S915, and the step S403 and the following steps are repeated. The other processing steps and conditions will not be described as they are the same as those of the second embodiment.

5th Embodiment

Figure 10:
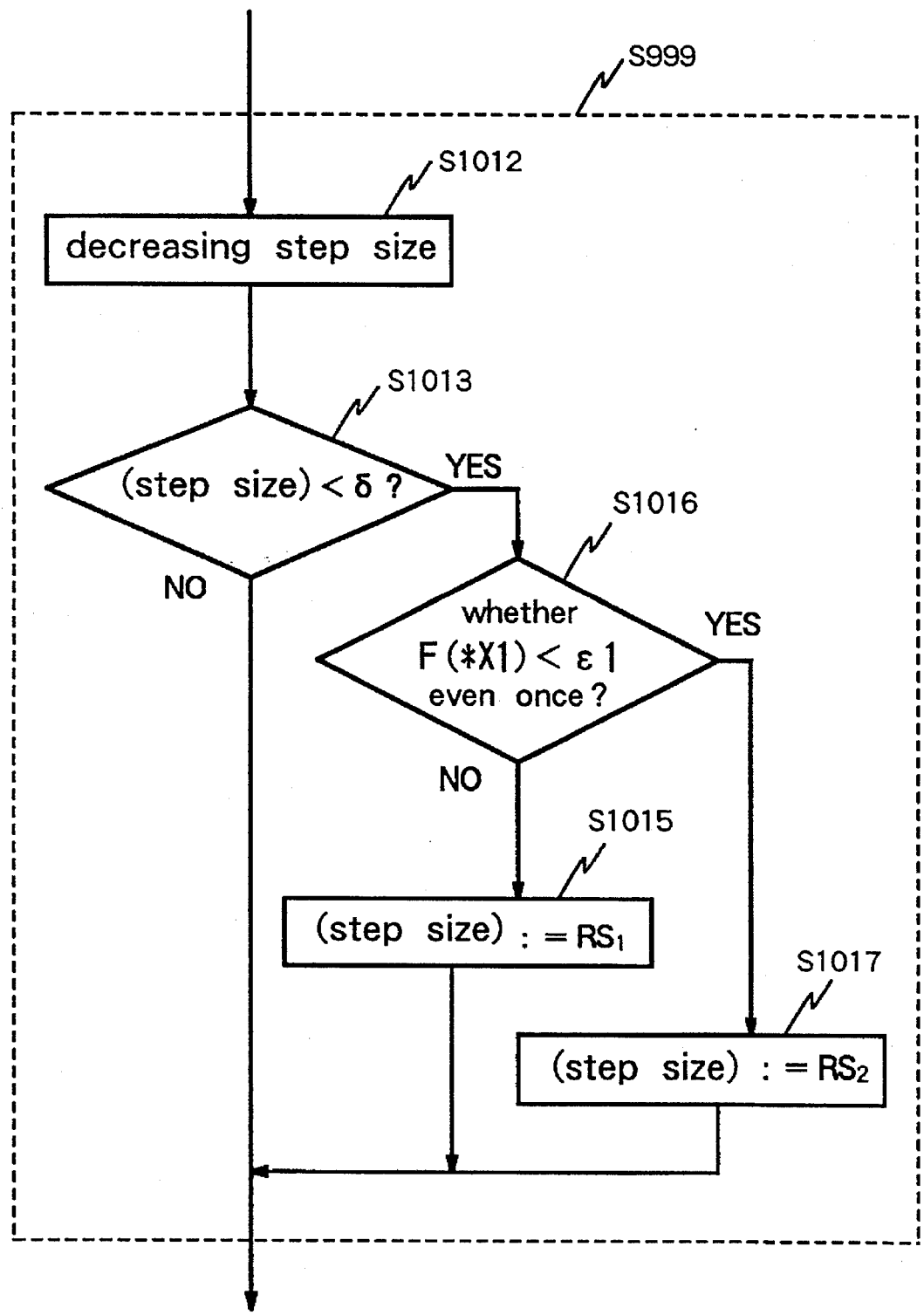
FIG. 10 is a flowchart showing a process of updating a step size in the fifth, sixth, eleventh, and twelfth embodiments of the present invention.

A fifth embodiment of the present invention will be described below with reference to the accompanying drawings. FIG. 3 is a flowchart showing the fifth embodiment of the present invention, and FIG. 10 is a flowchart showing a process of updating a step size in the fifth embodiment of the present invention.

The processing sequence of the fifth embodiment is substantially the same as that of the third embodiment. Identical processes in FIGS. 9 and 10 are indicated by identical final digits. The processing sequence shown in FIG. 10 is different from that shown in FIG. 9 in that if the decreased step size is smaller than δ in a step S1013, then instead of setting $RS_1$ as a new step size (as in the step S915 shown in FIG. 9), it is judged whether $F(*X_1)$ has ever even once been smaller than $\epsilon_1$ in a step S1016. If $F(*X_1)$ has always been greater than or equal to $\epsilon_1$, then $RS_1$ is set as the new step size in a step S1015. If $F(*X_1)$ has ever even once been smaller than $\epsilon_1$, then a second restart step size $RS_2$ is set as the new step size in a step S1017.

With regard to the process of the fifth embodiment used as the method of control for the circuit shown in FIG. 11, only those steps of the process which differ from the third embodiment will be described below with reference to FIGS. 3 and 10. If the pilot level $P_2$ obtained in the step S303 is greater than or equal to the pilot level $P_1$ prior to the exploration in the step S304, then the step size is decreased in a step S1012, and the decreased step size is compared with δ in the step S1013. If the decreased step size is greater than or equal to δ, then the decreased step size is set as a new step size, and the step S303 and the following steps are repeated. If the decreased step size is smaller than δ and $P_1$ has always been greater than or equal to $\epsilon_1$, then $RS_1$ is set as the new step size in the step S1015, and the step S303 and the following steps are repeated. If the decreased step size is smaller than δ and $P_1$ has ever even once been smaller than $\epsilon_1$, then $RS_2$ is set as the new step size in the step S1017, and the step S303 and the following steps are repeated. The other processing steps and conditions will not be described as they are the same as those of the third embodiment.

6th Embodiment

A sixth embodiment of the present invention will be described below with reference to the accompanying drawings. FIG. 4 is a flowchart showing the sixth embodiment of the present invention, and FIG. 10 is a flowchart showing a process of updating a step size in the sixth embodiment of the present invention.

The processing sequence of the sixth embodiment is substantially the same as that of the fourth embodiment. Identical processes in FIGS. 9 and 10 are indicated by identical final digits. The processing sequence shown in FIG. 10 is different from that shown in FIG. 9 in that if the decreased step size is smaller than δ in the step S1013, then instead of setting $RS_1$ as a new step size (as in the step S915 shown in FIG. 9), it is judged whether $F(*X_1)$ has ever even once been smaller than $\epsilon_1$ in the step S1016. If $F(*X_1)$ has always been greater than or equal to el, then $RS_1$ is set as the new step size in the step S1015. If $F(*X_1)$ has ever even once been smaller than $\epsilon_1$, then $RS_2$ is set as the new step size in the step S1017.

With regard to the process of the sixth embodiment used as the method of control for the circuit shown in FIG. 11, only those steps of the process which differ from the fourth embodiment will be described below with reference to FIGS. 4 and 10. If the pilot level $P_2$ obtained in the step S403 is greater than or equal to the pilot level $P_1$ prior to the exploration in the step S404, then the step size is decreased in the step S1012, and the decreased step size is compared with δ in the step S1013. If the decreased step size is greater than or equal to δ, then the decreased step size is set as a new step size, and the step S403 and the following steps are repeated. If the decreased step size is smaller than δ and $P_1$ has always been greater than or equal to $\epsilon_1$, then $RS_1$ is set as the new step size in the step S1015, and the step S403 and the following steps are repeated. If the decreased step size is smaller than δ and $P_1$ has ever even once been smaller than $\epsilon_1$, then $RS_2$ is set as the new step size in the step S1017, and the step S403 and the following steps are repeated. The other processing steps and conditions will not be described as they are the same as those of the fourth embodiment.

7th Embodiment

Figure 5:
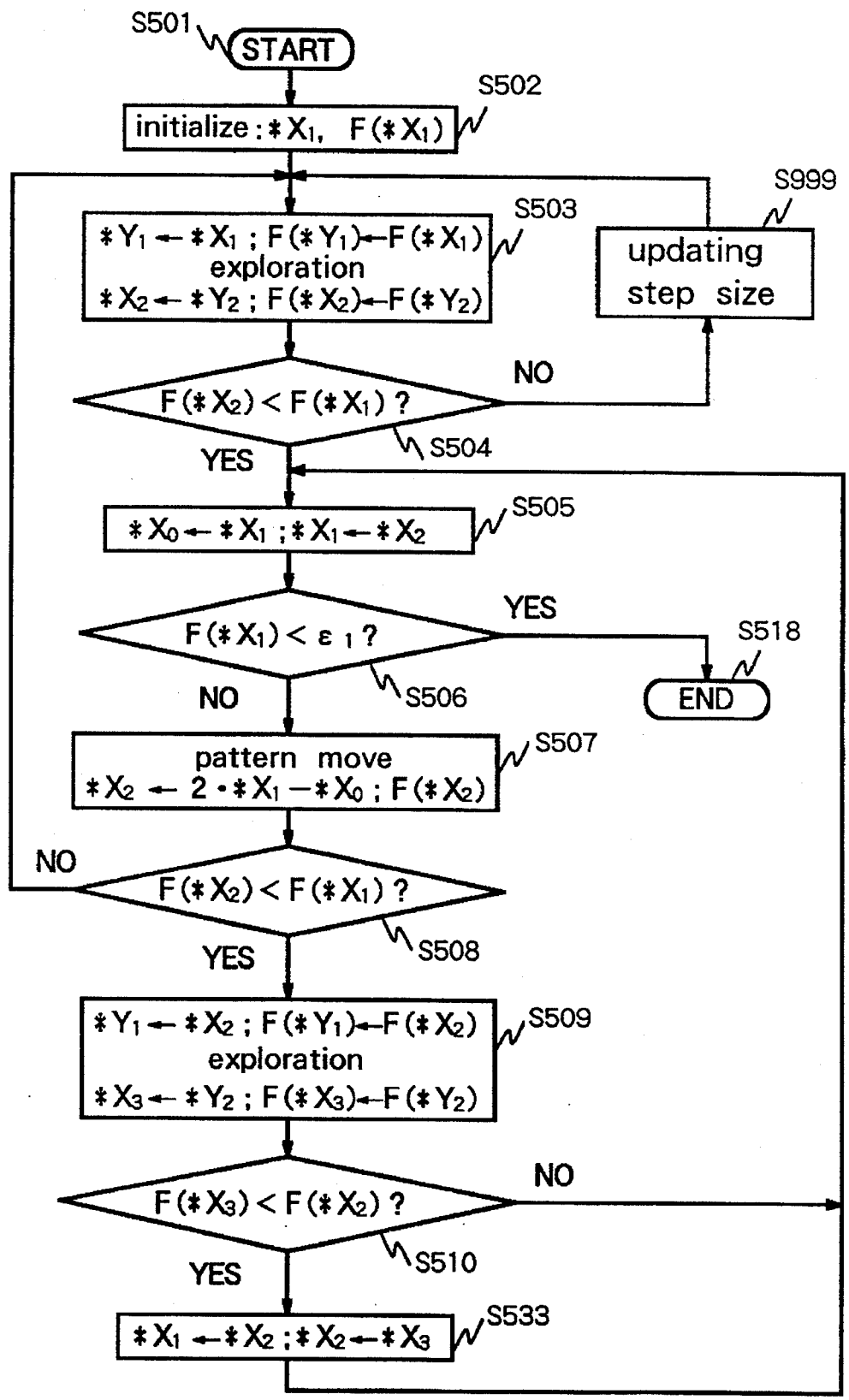
FIG. 5 is a flowchart showing seventh, ninth, and eleventh embodiments of the present invention.

A seventh embodiment of the present invention will be described below with reference to the accompanying drawings. FIG. 5 is a flowchart showing the seventh embodiment of the present invention, and FIG. 8 is a flowchart showing a process of updating a step size in the seventh embodiment of the present invention.

The processing sequence of the seventh embodiment is substantially the same as that of the first embodiment. Identical processes in FIGS. 3 and 5 are indicated by identical final digits. The processing sequence shown in FIG. 5 is different from that shown in FIG. 3 in that if the functional value F(*$X_3$) of the base point vector candidate *$X_3$ obtained in the step S509 is smaller than F(*$X_2$) in a step S510, then instead of updating the minimum value *$X_3$ as *$X_2$ (as in the step S311 shown in FIG. 3), *$X_3$ is updated as *$X_2$ and, at the same time, *$X_2$ is updated as *$X_1$, thus updating the base point vector used in the pattern move (S507) in a step S533.

With regard to the process of the seventh embodiment used as the method of control for the circuit shown in FIG. 11, only those steps of the process which differ from the first embodiment will be described below with reference to FIG. 5. If the pilot level $P_3$ obtained in the step S509 is smaller than the minimum pilot level $P_2$ determined at the present time in the step S510, then the exploration in the step S509 is considered as success, and $P_3$ is updated as the latest minimum pilot level $P_2$, and the control voltages $V_{L3}$, $V_{P3}$ applied to the variable attenuator 4 and the variable phase shifter 5 at this time are updated respectively as $V_{L2}$, $V_{P2}$. At the same time $P_2$ is updated as $P_1$, and $V_{L2}$, $V_{P2}$ are updated respectively as $V_{L1}$, $V_{P1}$ in the step S533. Then, a step S505 and the following steps are repeated. The other processing steps and conditions will not be described as they are the same as those of the first embodiment.

8th Embodiment

An eighth embodiment of the present invention will be described below with reference to the accompanying drawings. FIG. 6 is a flowchart showing the eighth embodiment of the present invention, and FIG. 8 is a flowchart showing a process of updating a step size in the eighth embodiment of the present invention.

The processing sequence of the eighth embodiment is substantially the same as that of the second embodiment. Identical processes in FIGS. 4 and 6 are indicated by identical final digits. The processing sequence shown in FIG. 6 is different from that shown in FIG. 4 in that if the functional value F(*$X_3$) of the base point vector candidate *$X_3$ obtained in the step S609 is smaller than F(*$X_2$) in a step S610, then instead of updating the minimum value *$X_3$ as *$X_2$ (as in a step S411 shown in FIG. 4), *$X_3$ is updated as *$X_2$ and, at the same time, *$X_2$ is updated as *$X_1$, thus updating the base point vector used in the pattern move (S607) in a step S633.

With regard to the process of the eighth embodiment used as the method of control for the circuit shown in FIG. 11, only those steps of the process which differ from the second embodiment will be described below with reference to FIG. 6. If the pilot level $P_3$ obtained in the step S609 is smaller than the minimum pilot level $P_2$ determined at the present time in the step S610, then the exploration in the step S609 is considered as success, and $P_3$ is updated as the latest minimum pilot level $P_2$, and the control voltages $V_{L3}$, $V_{P3}$ applied to the variable attenuator 4 and the variable phase shifter 5 at this time are updated respectively as $V_{L2}$, $V_{P2}$. At the same time, $P_2$ is updated as $P_1$, and $V_{L2}$, $V_{P2}$ are updated respectively as $V_{L1}$, $V_{P1}$ in the step S633. Then, a step S605 and the following steps are repeated. The other processing steps and conditions will not be described as they are the same as those of the second embodiment.

9th Embodiment

A ninth embodiment of the present invention will be described below with reference to the accompanying drawings. FIG. 5 is a flowchart showing the ninth embodiment of the present invention, and FIG. 9 is a flowchart showing a process of updating a step size in the ninth embodiment of the present invention.

The processing sequence of the ninth embodiment is substantially the same as that of the third embodiment. Identical processes in FIGS. 3 and 5 are indicated by identical final digits. The processing sequence shown in FIG. 5 is different from that shown in FIG. 3 in that if the functional value F(*$X_3$) of the base point vector candidate *$X_3$ obtained in the step S509 is smaller than F(*$X_2$) in the step S510, then instead of updating the minimum value *$X_3$ as *$X_2$ (as in the step S311 shown in FIG. 3), *$X_3$ is updated as *$X_2$ and, at the same time, *$X_2$ is updated as *$X_1$, thus updating the base point vector used in the pattern move (S507) in the step S533.

With regard to the process of the ninth embodiment used as the method of control for the circuit shown in FIG. 11, only those steps of the process which differ from the third embodiment will be described below with reference to FIG. 5. If the pilot level $P_3$ obtained in the step S509 is smaller than the minimum pilot level $P_2$ determined at the present time in the step S510, then the exploration in the step S509 is considered as success, and $P_3$ is updated as the latest minimum pilot level $P_2$, and the control voltages $V_{L3}$, $V_{P3}$ applied to the variable attenuator 4 and the variable phase shifter 5 at this time are updated respectively as $V_{L2}$, $V_{P2}$. At the same time, $P_2$ is updated as $P_1$, and $V_{L2}$, $V_{P2}$ are updated respectively as $V_{L1}$, $V_{P1}$ in the step S533. Then, the step S505 and the following steps are repeated. The other processing steps and conditions will not be described as they are the same as those of the third embodiment.

10th Embodiment

A tenth embodiment of the present invention will be described below with reference to the accompanying drawings. FIG. 6 is a flowchart showing the tenth embodiment of the present invention, and FIG. 9 is a flowchart showing a process of updating a step size in the tenth embodiment of the present invention.

The processing sequence of the tenth embodiment is substantially the same as that of the fourth embodiment. Identical processes in FIGS. 4 and 6 are indicated by identical final digits. The processing sequence shown in FIG. 6 is different from that shown in FIG. 4 in that if the functional value F(*$X_3$) of the base point vector candidate *$X_3$ obtained in the step S609 is smaller than F(*$X_2$) in the step S610, then instead of updating the minimum value *$X_3$ as *$X_2$ (as in the step S411 shown in FIG. 4), *$X_3$ is updated as *$X_2$ and, at the same time, *$X_2$ is updated as *$X_1$, thus updating the base point vector used in the pattern move (S607) in the step S633.

With regard to the process of the tenth embodiment used as the method of control for the circuit shown in FIG. 11, only those steps of the process which differ from the fourth embodiment will be described below with reference to FIG. 6. If the pilot level $P_3$ obtained in the step S609 is smaller than the minimum pilot level $P_2$ determined at the present time in the step S610, then the exploration in the step S609 is considered as success, and $P_3$ is updated as the latest minimum pilot level $P_2$, and the control voltages $V_{L3}$, $V_{P3}$ applied to the variable attenuator 4 and the variable phase shifter 5 at this time are updated respectively as $V_{L2}$, $V_{P2}$. At the same time, $P_2$ is updated as $P_1$, and $V_{L2}$, $V_{P2}$ are updated respectively as $V_{L1}$, $V_{P1}$ in the step S633. Then, the step S605 and the following steps are repeated. The other processing steps and conditions will not be described as they are the same as those of the fourth embodiment.

11th Embodiment

An eleventh embodiment of the present invention will be described below with reference to the accompanying drawings. FIG. 5 is a flowchart showing the eleventh embodiment of the present invention, and FIG. 10 is a flowchart showing a process of updating a step size in the eleventh embodiment of the present invention.

The processing sequence of the eleventh embodiment is substantially the same as that of the fifth embodiment. Identical processes in FIGS. 3 and 5 are indicated by identical final digits. The processing sequence shown in FIG. 5 is different from that shown in FIG. 3 in that if the functional value $F(*X_3)$ of the base point vector candidate $*X_3$ obtained in the step S509 is smaller than $F(*X_2)$ in the step S510, then instead of updating the minimum value $*X_3$ as $*X_2$ (as in the step S311 shown in FIG. 3), $*X_3$ is updated as $*X_2$ and, at the same time, $*X_2$ is updated as $*X_1$, thus updating the base point vector used in the pattern move (S507) in the step S533.

With regard to the process of the eleventh embodiment used as the method of control for the circuit shown in FIG. 11, only those steps of the process which differ from the fifth embodiment will be described below with reference to FIG. 5. If the pilot level $P_3$ obtained in the step S509 is smaller than the minimum pilot level $P_2$ determined at the present time in the step S510, then the exploration in the step S509 is considered as success, and $P_3$ is updated as the latest minimum pilot level $P_2$, and the control voltages $V_{L3}$, $V_{P3}$ applied to the variable attenuator 4 and the variable phase shifter 5 at this time are pated respectively as $V_{L2}$, $V_{P2}$. At the same time $P_2$ is updated as $P_1$, and $V_{L2}$, $V_{P2}$ are updated respectively as $V_{L1}$, $V_{P1}$ in the step S533. Then, the step S505 and the following steps are repeated. The other processing steps and conditions will not be described as they are the same as those of the fifth embodiment.

12th Embodiment

A twelfth embodiment of the present invention will be described below with reference to the accompanying drawings. FIG. 6 is a flowchart showing the twelfth embodiment of the present invention, and FIG. 10 is a flowchart showing a process of updating a step size in the twelfth embodiment of the present invention.

The processing sequence of the twelfth embodiment is substantially the same as that of the sixth embodiment. Identical processes in FIGS. 4 and 6 are indicated by identical final digits. The processing sequence shown in FIG. 6 is different from that shown in FIG. 4 in that if the functional value $F(*X_3)$ of the base point vector candidate $X_3$ obtained in the step S609 is smaller than $F(*X_2)$ in the step S610, then instead of updating the minimum value $*X_3$ as $*X_2$ (as in the step S411 shown in FIG. 4), $*X_3$ is updated as $*X_2$ and, at the same time, $*X_2$ is updated as $*X_1$, thus updating the base point vector used in the pattern move (S607) in the step S633.

With regard to the process of the twelfth embodiment used as the method of control of the circuit shown in FIG. 11, only those steps of the process which differ from the sixth embodiment will be described below with reference to FIG. 6. If the pilot level $P_3$ obtained in the step S609 is smaller than the minimum pilot level $P_2$ determined at the present time in the step S610, then the exploration in the step S609 is considered as success, and $P_3$ is updated as the latest minimum pilot level $P_2$, and the control voltages $V_{L3}$, $V_{P3}$ applied to the variable attenuator 4 and the variable phase shifter 5 at this time are updated respectively as $V_{L2}$, $V_{P2}$. At the same time, $P_2$ is updated as $P_1$, and $V_{L2}$, $V_{P2}$ are updated respectively as $V_{L1}$, $V_{P1}$ in the step S633. Then, the step S605 and the following steps are repeated. The other processing steps and conditions will not be described as they are the same as those of the sixth embodiment.

Here, outlines of the steps of the first through the twelfth embodiments will be described with reference to FIGS. 12A through 12D and 13A through 13D.

Figure 12A:
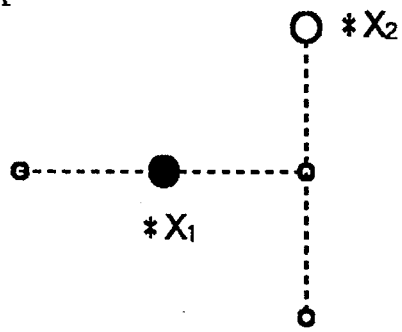
FIGS. 12A through 12D are flow diagrams showing the exploration and the pattern move of the first through the sixth embodiments.
Figure 12B:
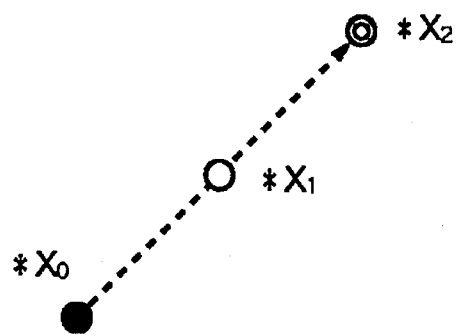
Figure 12C:
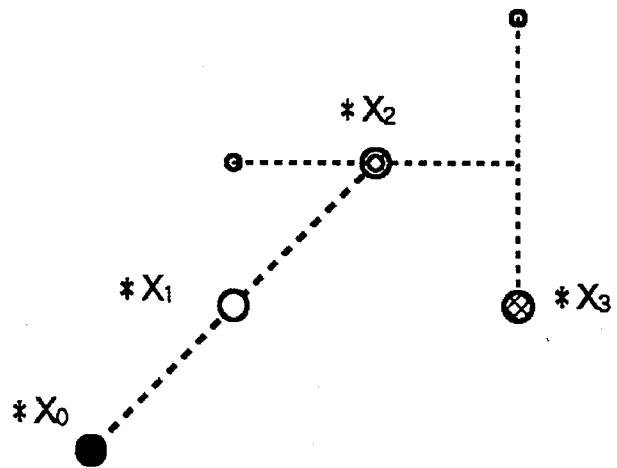
Figure 12D:
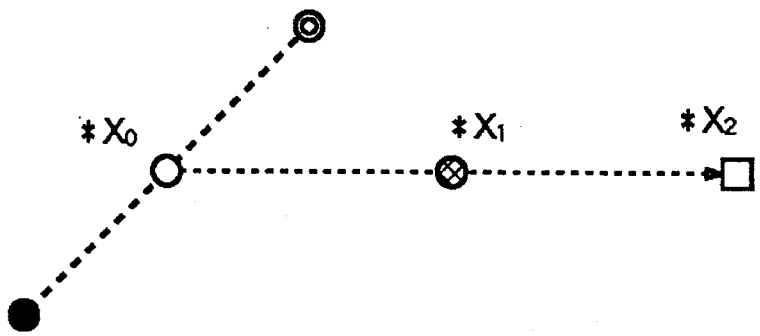

First, outlines of the steps of the first through the sixth embodiments will be described below with reference to FIGS. 3 and 12A through 12D. Outlines of the steps shown in FIG. 4 will not be described as it is identical to that shown in FIG. 3. FIGS. 12A through 12D are flow diagrams showing the exploration and the pattern move of the first through the sixth embodiments. As shown in FIG. 12A, the exploration is carried out from $*X_1$ which has been given in the initializing step (S302) in the step S303, obtaining $*X_2$. Then, $*X_1$, $*X_2$ are updated respectively as $*X_0$, $*X_1$ in the step S305. As shown in FIG. 12B, the pattern move is carried out from $*X_0$, $*X_1$, obtaining $*X_2$. Thereafter, as shown in FIG. 12C, the exploration is carried out from $*X_2$ in the step S309, obtaining $*X_3$. After updating $*X_3$ as $*X_2$ in the step S311, $*X_1$ is updated as $*X_0$ and $*X_2$ is updated as $*X_1$ in the step S305. Then, as shown in FIG. 12D, the pattern move is carried out with respect to $*X_0$, $*X_1$ which have been updated, obtaining $*X_2$ in the step S307.

Figure 13A:
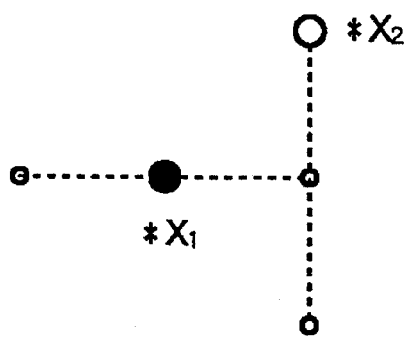
FIGS. 13A through 13D are flow diagrams showing the exploration and the pattern move of the seventh through the twelfth embodiments.
Figure 13B:
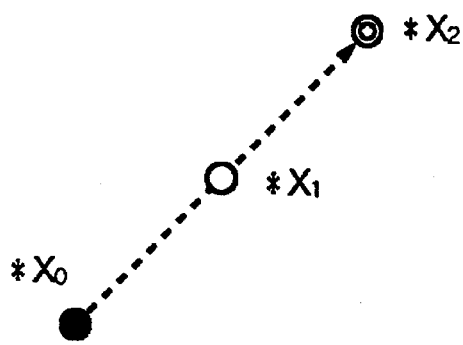
Figure 13C:
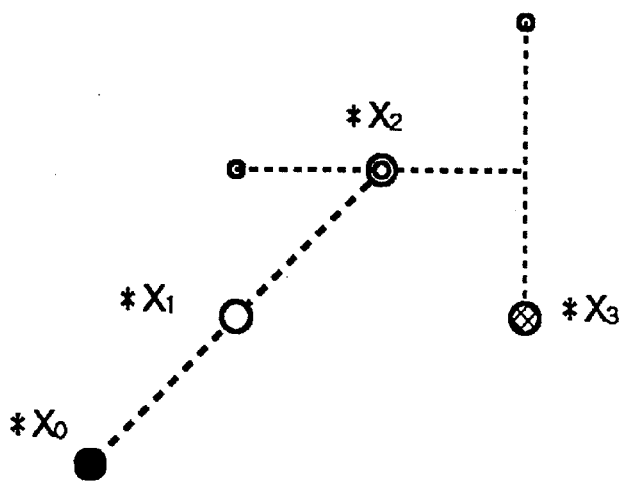
Figure 13D:
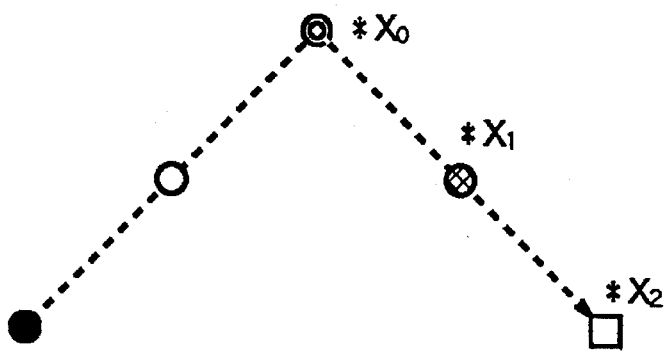

Next, outlines of the steps of the seventh through the twelfth embodiments will be described below with reference to FIGS. 5 and 13A through 13D. Outlines of the steps shown in FIG. 6 will not be described as it is identical to that shown in FIG. 5. FIGS. 13A through 13D are flow diagrams showing the exploration and the pattern move of the seventh through the twelfth embodiments. However, the steps shown in FIGS. 13A through 13C will not be described as they are identical to those shown in FIGS. 12A through 12C of the first through the sixth embodiments. After $*X_3$ has been obtained in the exploration shown in FIG. 13C, $*X_2$ is updated as $*X_1$ and $*X_3$ is updated as $*X_2$ in the step S533. Then, $*X_1$ is updated as $*X_0$ and $*X_2$ is updated as $*X_1$ in the step S505. Then, as shown in FIG. 13D, the pattern move is carried out with respect to $*X_0$, $*X_1$ which have been updated, obtaining $*X_2$ in the step S507.

Inasmuch as the processes of updating vectors in FIGS. 12A through 12D and 13A through 13D are different, the paths of the pattern move are different in FIGS. 12A through 12D and 13A through 13D.

It is to be understood that although the characteristics and advantages of the present invention have been set forth in the foregoing description, the disclosure is illustrative only, and changes may be made in the shape, size, and arrangement of the parts within the scope of the appended claims.

What is claimed is:

1. A trace-and-track method, in a system wherein a level of a physical signal is determined as a function of a set of control signals, wherein said set of control signals are denoted as a vector, the level of the physical signal is denoted as a functional value, and a changing of a vector is referred to as a vector movement, said method comprising:

an initializing step for setting a vector which gives a minimum value of a present function as a present minimum vector, and determining a functional value given by said present minimum vector by applying a first set of control signals corresponding to said present minimum vector to said system and setting a present minimum functional value in accordance with a first resulting level of the physical signal;

a first exploring step for carrying out a first vector movement to change coordinate components of said present minimum vector in positive and negative directions, determining a functional value given by a vector at said coordinate components obtained by said first vector movement by applying first respective sets of control signals corresponding to said first vector movement to said system, and setting a minimum value of said determined functional value as a new minimum functional value in accordance with first respective resulting levels of the physical signals, thereby obtaining a new minimum vector;

a first function comparing step for comparing said new minimum functional value obtained by said first exploring step with said present minimum functional value, proceeding to a first vector updating step if said new minimum functional value is smaller than said present minimum functional value, and proceeding to a step size updating step if said new minimum functional value is greater than or equal to said present minimum functions value;

said step size updating step for updating a step size used by said first exploring step, and returning to said first exploring step;

said first vector updating step of updating said present minimum vector as an old minimum vector, updating said new minimum vector as said present minimum vector, updating said present minimum functional value as an old minimum functional value, and updating said new minimum functional value as said present minimum functional value;

a second function comparing step for comparing said present minimum functional value obtained by said first vector updating step with a first functional threshold value, proceeding to pattern moving step if said present minimum functional value is greater than or equal to said first functional threshold value, and proceeding to an ending step if said present minimum functional value is smaller than said first functional threshold value;

said ending step for ending said trace-and-track method;

said pattern moving step for determining a new vector from said old minimum vector and said present minimum vector, setting said new vector as said new minimum vector, and determining a functional value given by said new minimum vector by applying a second set of control signals corresponding to said new minimum vector to said system and setting said new minimum functional value in accordance with a second resulting level of the physical signal;

a third function comparing step for comparing said new minimum functional value obtained by said pattern moving step with said present minimum functional value, proceeding to a second exploring step if said new minimum functional value is smaller than said present minimum functional value, and returning to said first exploring step if said new minimum functional value is greater than or equal to said present minimum functional value;

said second exploring step for carrying out a second vector movement to change coordinate components of said new minimum vector in positive and negative directions, determining a functional value given by a vector at said coordinate components obtained by said second vector movement by applying second respective sets of control signals corresponding to said second vector movement to said system, and setting a minimum value of said determined functional value as a new minimum functional value candidate in accordance with second respective resulting levels of the physical signals, thereby obtaining a new minimum vector candidate;

a fourth function comparing step for comparing said new minimum functional value candidate obtained by said second exploring step with said new minimum functional value, proceeding to a second vector updating step if said new minimum functional value candidate is smaller than said new minimum functional value, and returning to said first vector updating step if said new minimum functional value candidate is greater than or equal to said new minimum functional value; and said second vector updating step for updating said new minimum vector candidate as said new minimum vector, updating said new minimum functional value candidate as said new minimum functional value, and returning to said first vector updating step.

2. A trace-and-track method according to claim 1, wherein one of said first exploring step and said second exploring step comprises:

a base point vector storing step for storing a base point vector, which is a vector given as a exploratory base point, as a new base point vector;

a coordinate component designating step for designating discretionary coordinate components of said base point vector;

a vector increasing step for increasing said indicated coordinate components of said base point vector in said step size, obtaining a base point vector candidate;

a fifth function comparing step for comparing a base point functional value candidate, which is determined by applying a third set of control signals corresponding to said base point vector candidate obtained by said vector increasing step to said system and setting said base point functional value candidate in accordance with a third resulting level of the physical signal, with a new base point functional value determined by applying a fourth set of control signals corresponding to said new base point vector to said system and setting said new base point functional value in accordance with a fourth resulting level of the physical signal, proceeding to a first base point vector updating step if said base point functional value candidate is smaller than said new base point functional value, and proceeding to vector decreasing step if said base point functional value candidate is greater than or equal to said new base point functional value;

said first base point vector updating step for updating said base point vector candidate as said new base point vector, updating said base point functional value candidate as said new base point functional value, and proceeding to said vector decreasing step;

said vector decreasing step for decreasing said indicated coordinate components of said base point vector in said step size, obtaining said base point vector candidate;

a sixth function comparing step for comparing said base point functional value candidate, which is determined by applying a fifth set of control signals corresponding to said base point vector candidate obtained by said vector decreasing step to said system and setting said base point functional value candidate in accordance with a fifth resulting level of the physical signal, with said new base point functional value, proceeding to a second base point vector updating step if said base point functional value candidate is smaller than said new base point functional value, and proceeding to third base point vector updating step if said base point functional value candidate is greater than or equal to said new base point functional value;

said second base point vector updating step for updating said base point vector candidate as said new base point vector, updating said base point functional value candidate as said new base point functional value, and proceeding to said third base point vector updating step;

said third base point vector updating step for updating said new base point vector as said base point vector and updating said new base point functional value as a base point functional value;

a coordinate component judging step for judging whether designation of all coordinate components of said base point vector obtained by said third base point vector updating step has been finished or not, and ending said one of said first exploring step and said second exploring step if said designation of all coordinate components has been finished, and proceeding to a coordinate component updating step if said designation of all coordinate components has not been finished; and said coordinate component updating step for updating said indicated coordinate components, designating coordinate components which have not been indicated and returning to said vector increasing step.

3. A trace-and-track method according to claim 2, wherein said step size updating step comprises:

a step size decreasing step for decreasing said step size;

a step size comparing step for comparing a decreased step size obtained by said step size decreasing step with a step size threshold value, ending said step size updating step if said decreased step size is greater than or equal to said step size threshold value, and proceeding to first step size setting step if said decreased step size is smaller than said step size threshold value; and said first step size setting step for setting said step size threshold value as said decreased step size, and ending said step size updating step.

4. A trace-and-track method according to claim 3, comprising a third vector updating step in place of said second vector updating step, for updating said new minimum vector as said present minimum vector, updating said new minimum vector candidate as said new minimum vector, updating said new minimum functional value as said present minimum functional value, updating said new minimum functional value candidate as said new minimum functional value, and returning to said first vector updating step.

5. A trace-and-track method according to claim 3, comprising monitoring step in place of said ending step, for comparing said present minimum functional value obtained by said first vector updating step with a second functional threshold value, repeating said monitoring step if said present minimum functional value is smaller than said second functional threshold value, and returning to said first exploring step if said present minimum functional value is greater than or equal to said second functional threshold value.

6. A trace-and-track method according to claim 5, comprising a third vector updating step in place of said second vector updating step, for updating said new minimum vector as said present minimum vector, updating said new minimum vector candidate as said new minimum vector, updating said new minimum functional value as said present minimum functional value, updating said new minimum functional value candidate as said new minimum functional value, and returning to said first vector updating step.

7. A trace-and-track method according to claim 2, wherein said step size updating step comprises:

a step size decreasing step for decreasing said step size;

a step size comparing step for comparing a decreased step size obtained by said step size decreasing step with a step size threshold value, ending said step size updating step if said decreased step size is greater than or equal to said step size threshold value, and proceeding to first step size setting step if said decreased step size is smaller than said step size threshold value; and said first step size setting step for setting a first restart step size as said decreased step size, and ending said step size updating step.

8. A trace-and-track method according to claim 7, comprising a third vector updating step in place of said second vector updating step, for updating said new minimum vector as said present minimum vector, updating said new minimum vector candidate as said new minimum vector, updating said new minimum functional value as said present minimum functional value, updating said new minimum functional value candidate as said new minimum functional value, and returning to said first vector updating step.

9. A trace-and-track method according to claim 7, comprising a monitoring step in place of said ending step, for comparing said present minimum functional value obtained by said first vector updating step with a second functional threshold value, repeating said monitoring step if said present minimum functional value is smaller than said second functional threshold value, and returning to said first exploring step if said present minimum functional value is greater than or equal to said second functional threshold value.

10. A trace-and-track method according to claim 9, comprising a third vector updating step in place of said second vector updating step, for updating said new minimum vector as said present minimum vector, updating said new minimum vector candidate as said new minimum vector, updating said new minimum functional value as said present minimum functional value, updating said new minimum functional vale candidate as said new minimum functional value, and returning to said first vector updating step.

11. A trace-and-track method according to claim 2, wherein said step size updating step comprises:

a step size decreasing step for decreasing said step size;

a step size comparing step for comparing a decreased step size obtained by said step size decreasing step with a step size threshold value, ending said step size updating step if said decreased step size is greater than or equal to said step size threshold value, and proceeding to functional value judging step if said decreased step size is smaller than said step size threshold value;

said functional value judging step for judging whether said present minimum functional value has ever even once been smaller than said first functional threshold value, proceeding to a first step size setting step if said present minimum functional value has always been greater than or equal to said first functional threshold value, and proceeding to a second step size setting step if said present minimum functional value has ever even once been smaller than said first functional threshold value;

said first step size setting step for setting a first restart step size as said decreased step size, and ending said step size updating step; and said second step size setting step for setting a second restart step size as said decreased step size, and ending said step size updating step.

12. A trace-and-track method according to claim 11, comprising a third vector updating step in place of said second vector updating step, for updating said new minimum vector as said present minimum vector, updating said new minimum vector candidate as said new minimum vector, updating said new minimum functional value as said present minimum functional value, updating said new minimum functional value candidate as said new minimum functional value, and returning to said first vector updating step.

13. A trace-and-track method according to claim 11, comprising a monitoring step in place of said ending step, for comparing said present minimum functional value obtained by said first vector updating step with a second functional threshold value, repeating said monitoring step if said present minimum functional value is smaller than said second functional threshold value, and returning to said first exploring step if said present minimum functional value is greater than or equal to said second functional threshold value.

14. A trace-and-track method according to claim 13, comprising a third vector updating step in place of said second vector updating step, for updating said new minimum vector as said present minimum vector, updating said new minimum vector candidate as said new minimum vector, updating said new minimum functional value as said present minimum functional value, updating said new minimum functional value candidate as said new minimum functional value, and returning to said first vector updating step.

15. An automatic control system for tracing and tracking a level of a physical signal of a circuit, said automatic control system comprising:

a control circuit for moving the level of the physical signal toward a desired level, said control circuit being configured to receive the physical signal and to provide a set of control signals to the circuit, wherein the level of the physical signal varies in response to varying the set of control signals, and wherein said control circuit includes:

first exploration means for determining a first set of control signals based on varying at least one control signal of a current set of controls signals in accordance with a step size to produce a first level of the physical signal;

first comparing means for comparing the first level of the physical signal with a current level of the physical signal to determine which moves closer to the desired level;

step size updating means for providing an updated step size to the first exploration means, if the first level of the physical signal is determined by the first comparing means as not moving closer to the desired level than the current level of the physical signal;

first setting means for setting the current set of control signals as a previous set of control signals and the first set of control signals as the current set of control signals if the first level of the physical signal is determined by the first comparing means as moving closer to the desired level than the current level of the physical signal;

pattern move means for determining a second set of control signals based on the previous set of control signals and the current set of control signals, as set by the first setting means, said second set of control signals producing a second level of the physical signal;

second exploration means for determining a third set of control signals based on varying at least one control signal of the second set of control signals in accordance with the step size to produce a third level of the physical signal;

second comparing means for comparing the second level of the physical signal with the third level of the physical signal to determine which moves closer to the desired level, wherein said second comparing means provides the current set of control signals to the first exploration means if the third level of the physical signal does not move closer to the desired level than the second level of the physical signal; and second setting means for setting the third set of control signals as the first set of control signals and providing the first set of control signals, as set by the second setting means, to the first setting means, if the third level of the physical signal is determined by the second comparing means as moving closer to the desired level than the second level of the physical signal, wherein said first exploration means varies the one control signal of the current set of control signals in a first direction to produce a first exploratory level of the physical signal, and in a second direction to produce a second exploratory level of the physical signal regardless of whether the first exploratory level of the physical signal moves closer to the desired level than the current level of the physical signal.

16. An automatic control system for tracing and tracking a level of a physical signal of a circuit according to claim 15, further comprising:

third comparing means for comparing the second level of the physical signal with the current level of the physical signal corresponding to the current set of control signals, as set by the first setting means, to determine which level moves closer to the desired level, wherein if the second level of the physical signal does not move closer to the desired level than the current level of the physical signal, said third comparing means provides the current set of control signals to the first exploration means.

17. An automatic control system for tracing and tracking a level of a physical signal of a circuit according to claim 15, further comprising:

third comparing means for comparing the current level of the physical signal corresponding to the current set of control signals, as set by the first setting means, with a first target level to determine if further control is required.

18. An automatic control system for tracing and tracking a level of a physical signal of a circuit according to claim 17, further comprising:

monitoring means for monitoring the current level of the physical signal if the third comparing means determines that further control is not required, wherein said monitoring means compares the current level of the physical signal with a second target level and, if said monitoring means determines that further control is required, said monitoring means provides the current set of control signals to said first exploration means.

19. An automatic control system for tracing and tracking a level of a physical signal of a circuit according to claim 15, wherein said step size updating means comprises:

adjusting means for adjusting the step size; and third comparing means for comparing the adjusted step size with a step size threshold, wherein if the adjusted step size is determined to be beyond the step size threshold, the step size is set to the step size threshold.

20. An automatic control system for tracing and tracking a level of a physical signal of a circuit according to claim 15, wherein said step size updating means comprises:

adjusting means for adjusting the step size; and third comparing means for comparing the adjusted step size with a step size threshold, wherein if the adjusted step size is determined to be beyond the step size threshold, the step size is set to a first restart step size.

21. An automatic control system for tracing and tracking a level of a physical signal of a circuit according to claim 15, wherein said step size updating means comprises:

adjusting means for adjusting the step size;

third comparing means for comparing the adjusted step size with a step size threshold;

determining means for determining whether the level of the physical signal has been at least once beyond a first target level, if the adjusted step size is determined by said third comparing means to be beyond the step size threshold, wherein the step size is set to a first restart step size if the level of the physical signal is determined to not have been at least once beyond the first target level, and wherein the step size is set to a second restart step size if the level of the physical signal is determined to have been at least once beyond the first target level.

22. A trace-and-track method for controlling a level of a physical signal of a circuit to move the level of the physical signal toward a desired level, wherein the level of the physical signals varies in response to varying a set of control signals, said method comprising the steps of:

(A) determining a first set of control signals based on varying at least one control signal of a current set of control signals in accordance with a step size to produce a first level of the physical signal;

(B) comparing the first level of the physical signal with a current level of the physical signal to determine which moves closer to the desired level;

(C) updating the step size and repeating steps (A–C), if the first level of the physical signal is determined in step (B) as not moving closer to the desired level than the current level of the physical signal;

(D) setting the current set of control signals as a previous set of control signals and the first set of control signals as the current set of control signals if the first level of the physical signal is determined by step (B) as moving closer to the desired level than the current level of the physical signal;

(E) determining a second set of control signals based on the previous set of control signals and the current set of control signals, as set in step (D), said second set of control signals producing a second level of the physical signal;

(F) determining a third set of control signals based on varying at least one control signal of the second set of control signals in accordance with the step size to produce a third level of the physical signal;

(G) comparing the second level of the physical signal with the third level of the physical signal to determine which moves closer to the desired level;

(H) repeating steps (A–H), if the third level of the physical signal is determined in step (G) as not moving closer to the desired level than the second level of the physical signal; and (I) setting the third set of control signals as the first set of control signals and repeating steps (D–I), if the third level of the physical signal is determined in step (G) as moving closer to the desired level than the second level of the physical signal, wherein, in step (A), the one control signal of the current set of control signals is varied in a first direction to produce a first exploratory level of the physical signal, and in a second direction to produce a second exploratory level of the physical signal regardless of whether the first exploratory level of the physical signal moves closer to the desired level than the current level of the physical signal.

23. A trace-and-track method according to claim 22, further comprising, between steps (E) and (F), the steps of:

(i) comparing the second level of the physical signal with the current level of the physical signal corresponding to the current set of control signals, as set in step (D), to determine which level moves closer to the desired level; and (ii) repeating steps (A–E) and (i) if the second level of the physical signal is determined in step (i) as not moving closer to the desired level than the current level of the physical signal.

24. A trace-and-track method according to claim 22, further comprising, between steps (D) an (E), the step of:

(i) comparing the current level of the physical signal corresponding to the current set of control signals, as set in step (D), with a first target level to determine if further control is required.

25. A trace-and-track method according to claim 24, further comprising the steps of:

(ii) monitoring the current level of the physical signal if step (i) determines that further control is not required, wherein, during step (ii), the current level of the physical signal is compared with a second target level to determine if further control is required; and (iii) repeating the trace-and-track method beginning with step (A), if further control is determined to be required in step (ii).

26. A trace-and-track method according to claim 22, wherein step (C) comprises the steps of:

(i) adjusting the step size;

(ii) comparing the adjusted step size with a step size threshold; and (iii) setting the step size to the step size threshold, if the adjusted step size is determined in step (ii) to be beyond the step size threshold.

27. A trace-and-track method according to claim 22, wherein said step (C) comprises the steps of:

(i) adjusting the step size; and (ii) comparing the adjusted step size with a step size threshold; and (iii) setting the step size to a first restart step size, if the adjusted step size is determined to be beyond the step size threshold.

28. A trace-and-track method according to claim 22, wherein said step (C) comprises the steps of:

(i) adjusting the step size;

(ii) comparing the adjusted step size with a step size threshold;

(iii) determining whether the level of the physical signal has at least once been beyond a first target level, if the adjusted step size is determined by step (ii) to be beyond the step size threshold;

(iv) setting the step size to a first restart step size if the level of the physical signal is determined by step (iii) to not have been at least once beyond the first target level; and (v) setting the step size to a second restart step size if the level of the physical signal is determined by step (iii) to have been at least once beyond the first target level.

* * * * *